(12) United States Patent
Schmit

(10) Patent No.: US 7,089,141 B2
(45) Date of Patent: Aug. 8, 2006

(54) MEASUREMENT SYSTEM WHICH USES A STATE MODEL

(75) Inventor: Geoffrey C. Schmit, Naperville, IL (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 10/260,793

(22) Filed: Sep. 30, 2002

(65) Prior Publication Data

US 2003/0093245 A1 May 15, 2003

Related U.S. Application Data

(63) Continuation-in-part of application No. 10/008,792, filed on Nov. 13, 2001, now Pat. No. 6,879,926.

(51) Int. Cl.
*G06F 19/00* (2006.01)

(52) U.S. Cl. .................................. 702/123; 702/127

(58) Field of Classification Search ................. 702/123, 702/127, 119, 176–178, 181–187, 120; 706/46, 706/920, 48, 60, 59, 61, 903–908, 911–916, 706/919, 922; 717/104, 105, 115, 120, 121, 717/168, 124–126; 700/17, 18, 23, 27, 83, 700/86, 87; 703/4, 6, 7, 22–24; 718/100, 718/106, 102; 345/522, 440, 965–967, 970, 345/771; 714/7, 25, 37, 38; 710/10, 8, 15
See application file for complete search history.

(56) References Cited

U.S. PATENT DOCUMENTS

| | | | | |
|---|---|---|---|---|
| 4,812,996 A | * | 3/1989 | Stubbs ........................ | 702/123 |
| 4,868,785 A | | 9/1989 | Jordan et al. ................ | 345/440 |
| 4,884,228 A | | 11/1989 | Stanley et al. ............... | 702/123 |
| 5,133,045 A | | 7/1992 | Gaither et al. ................ | 706/46 |
| 5,136,705 A | | 8/1992 | Stubbs et al. ................. | 714/27 |
| 5,155,836 A | | 10/1992 | Jordan et al. ................. | 703/23 |
| 5,481,741 A | | 1/1996 | McKaskle et al. ........... | 345/522 |
| 5,630,164 A | | 5/1997 | Williams et al. .............. | 703/24 |
| 5,812,394 A | * | 9/1998 | Lewis et al. .................. | 700/17 |
| 5,926,775 A | | 7/1999 | Brumley et al. ............. | 702/127 |
| 5,991,537 A | | 11/1999 | McKeon et al. ............. | 717/115 |
| 6,067,584 A | | 5/2000 | Hayles et al. ................. | 710/10 |
| 6,096,094 A | | 8/2000 | Kay et al. ..................... | 717/168 |
| 6,098,028 A | | 8/2000 | Zwan et al. .................. | 702/120 |
| 6,173,438 B1 | | 1/2001 | Kodosky et al. .............. | 717/1 |
| 6,219,628 B1 | | 4/2001 | Kodosky et al. .............. | 703/2 |
| 6,591,146 B1 | | 7/2003 | Pavlovic et al. ............. | 700/29 |
| 6,683,968 B1 | * | 1/2004 | Pavlovic et al. ............. | 382/103 |
| 2003/0001896 A1 | | 1/2003 | Johnson et al. ............... | 35/771 |
| 2003/0004670 A1 | | 1/2003 | Schmit et al. ............... | 702/123 |

OTHER PUBLICATIONS

Reda A. Ammar and Carolyn Pe Rosiene, "Visualizing a Hierarchy of Performance Models for Software Systems", Software–Practice and Experience, vol. 23 (3), Mar. 1993, pp. 293–315.

* cited by examiner

*Primary Examiner*—Hal Wachsman
(74) *Attorney, Agent, or Firm*—Meyertons Hood Kivlin Kowert & Goetzel, P.C.; Jeffrey C. Hood; Mark S. Williams

(57) ABSTRACT

System and method for using a task state model to perform measurement tasks. The system includes a computer system, one or more measurement resources, and a task state model. Attributes for performing the measurement task are specified. The task is transitioned from an Initial state to a Deployed state, thereby compiling the attributes to primitive settings and deploying the primitive settings into a run-time for the measurement task. The task is transitioned from the Deployed state to an Executing state, thereby acquiring the measurement resources to perform the task, configuring the measurement resources with the primitive settings to perform the task, and executing the run-time to perform the measurement task using the measurement resources. One or more methods may be invoked which result in explicit state transitions, and which may include one or more implicit state transitions which may be programmatically performed before, during, or after the measurement task.

69 Claims, 14 Drawing Sheets

MEASUREMENT SYSTEM WHICH USES A STATE MODEL

CONTINUATION DATA

This application is a continuation-in-part of U.S. application Ser. No. 10/008,792 titled "Measurement System Software Architecture for Easily Creating High-Performance Measurement Applications" filed Nov. 13, 2001, now U.S. Pat. No. 6,879,926 whose inventors were Geoffrey Schmit, Brent Schwan, Jonathan Brumley, Tom Makowski and Chris Bartz.

FIELD OF THE INVENTION

The present invention relates to the field of measurement and automation systems, and more particularly to a measurement system which uses a state model to provide improved flexibility and performance.

DESCRIPTION OF THE RELATED ART

Scientists and engineers often use measurement or automation systems to perform a variety of functions, including measurement of a physical phenomena or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system comprises a computer system with a measurement device or measurement hardware. The measurement device may be or include a computer-based instrument, a data acquisition device or board, a programmable logic device (PLD), a sensor, a smart sensor, an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or parallel port of the computer system. Optionally, the measurement system includes signal conditioning devices which receive the field signals and condition the signals to be acquired. A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straight-forward.

Some comprehensive and complex measurement system architectures, for example, National Instruments" NI-DAQ 6.9, have various drawbacks which limit the effectiveness and ease with which a measurement task may be specified, designed, and implemented. One performance related inadequacy of some current architectures is a lack of a state model for the system. The absence of a state model results in resources being reserved, programmed, and unreserved continuously, because no component or process is aware of what may have already been done. These unnecessary operations may result in a large number of kernel transitions, which can substantially affect performance, as is well known in the art.

Additionally, in prior art measurement systems which do utilize a state model, the state model is generally coupled to the status of measurement resources, i.e., hardware and/or software, installed in the measurement system, and thus may substantially limit the flexibility and use of the measurement system when multiple measurement tasks are to be performed.

Therefore, it would be desirable to provide new systems and methods for specifying and performing measurement tasks.

SUMMARY OF THE INVENTION

Various embodiments of a system and method for using a state model to perform measurement tasks are presented. The system may include a computer system, including a processor and a memory medium coupled to the processor. The memory medium may store program instructions executable to perform a measurement task, such as data acquisition and/or signal generation, and a state model which includes a plurality of states, each of which corresponds to a status of measurement resources used to perform the measurement task and/or the measurement task itself. One or more measurement resources may be coupled to the computer system. The memory medium may include one or more graphical programs, e.g., National Instruments' LabVIEW graphical programs, which may implement various embodiments of the present invention. The program instructions may be executable to use transitions among the states to perform the measurement task using the one or more measurement resources. More specifically, the measurement system may operate to use the state model to perform various embodiments of the following method:

In one embodiment, input may be received specifying one or more attributes for performing the measurement task. The task may be transitioned from an Initial state to a Deployed state, thereby compiling the one or more attributes to one or more primitive settings, and deploying the one or more primitive settings into a run-time for the measurement task. The task may then be transitioned from the Deployed state to an Executing state, thereby acquiring one or more measurement resources to perform the measurement task, configuring the one or more measurement resources with the one or more primitive settings to perform the measurement task, and executing the run-time to perform the measurement task using the one or more measurement resources.

Input may then be received invoking termination of the measurement task. Alternatively, a stop node may be executed to invoke termination of the task. The task may then be transitioned from the Executing state to the Deployed state, thereby terminating operation of the measurement resources, un-configuring, and releasing the measurement resources. One or more of the attributes may then be modified, transitioning the task from the Deployed state to the Initial state.

In one embodiment, the plurality of states, e.g., Initial, Deployed, and Executing states, comprises a sequence of states. The method may include transitioning from a current state of the sequence of states to a non-contiguous target state of the sequence of states, where the transitioning includes programmatically transitioning from the current state through one or more intermediate states of the sequence of states to the noncontiguous target state. In other words, one or more implicit state transitions may be performed in transitioning from the current state to the target state. Note that as used herein, the terms "programmatic" and "implicit" transitions mean that the transitions are determined and made without user input or user programming specifying the transitions. For example, if the user specifies or programs a read operation in the program, but when the read is to execute the task is not already in the correct state, the system may implicitly or programmatically transition the task to the correct state prior to executing the read, as opposed to the user having to specify or program the state transitions to bring the task to the correct state. In one embodiment, implicit or programmatic state transitions may not be apparent to the user. In other words, no indication may be given to the user that such transitions are occurring.

In one embodiment, the measurement task is represented by a software object that models the different aspects of performing the measurement task. More specifically, the measurement task may include a measurement task specification containing the one or more attributes which specify the measurement task, primitive settings which result from compiling the attributes into measurement resource-specific settings, and one or more measurement primitives which may be configured with the primitive settings, and which manage the measurement resources to perform the measurement task. For example, where the measurement resources include hardware and/or software, the measurement primitives may include hardware primitives and/or software primitives.

In other embodiments, other (equivalent) states may be used in the state model to perform the measurement task. For example, in one embodiment, the method may include receiving input specifying one or more attributes for performing the measurement task. The task may then be transitioned from an Unverified state to a Verified state, thereby compiling the one or more attributes to one or more primitive settings, and deploying the one or more primitive settings into a run-time for the measurement task. The task may then be transitioned from the Verified state to a Reserved state, thereby acquiring one or more measurement resources to perform the measurement task. Then, the method may transition the task from the Reserved state to a Committed state, thereby configuring the one or more measurement resources with the one or more primitive settings, where after being configured, the one or more resources are operable to perform the measurement task. Finally, the task may be transitioned from the Committed state to a Running state, thereby executing the run-time to perform the measurement task using the one or more measurement resources.

As described above, invoking termination of the measurement task may cause successive state transitions back through the states. For example, in response to terminating the measurement task, the method may transition the task from the Running state to the Committed state, thereby terminating operation of the one or more measurement resources, then transition the task from the Committed state to the Reserved state, thereby un-configuring the one or more measurement resources. The method may then transition the task from the Reserved state to the Verified state, thereby releasing the one or more measurement resources. Finally, one or more of the attributes may be modified, thereby transitioning the task from the Verified state to the Unverified state.

Some of the state transitions involved in performing the measurement task may be implicit, i.e., may be performed programmatically. For example, in one embodiment, the measurement task may be in a first state. User input may be received invoking a first operation that necessitates a transition from the first state to a second state of the plurality of states. For example, the task may be in an Initial state, e.g., in the Verified state, and the first operation may be a Read method which requires that the task be in the Running state. The method may then programmatically transition from the first task state (e.g., Verified) through one or more intermediate task states of the plurality of task states to the second task state (e.g., Running). Thus, following the example from above, the transitions from the Verified state, through the Reserved and Committed states (the intermediate states), to the Running state may be implicit. In other words, from the user's perspective, the task simply goes straight from the Verified state to performing the Read operation.

Similarly, the method may receive user input invoking a second operation that necessitates a transition from the second state to a first intermediate state of the one or more intermediate states. For example, the user input may invoke termination of the Read operation, e.g., by calling a Stop method, or by executing a Stop program node, which may necessitate a state transition from the Running state to the Committed state. The method may then programmatically transition from the second state (Running) through zero or more of the intermediate states to the first intermediate state (Committed), then programmatically transition from the first intermediate state (Committed) through zero or more others of the intermediate states to the first state (Verified). Thus, from the user's point of view, upon termination of the Read operation, the task returns to the original state, i.e., the Verified state, greatly simplifying the apparent operation of the measurement system in performing the measurement task. Thus, the system may provide one or more methods (e.g., Read, Write, etc.) which are each executable to invoke at least one of the one or more state transitions among the plurality of states to perform the measurement task. Additionally, in one embodiment, at least one of the methods may be executable to invoke a plurality of implicit state transitions, as described above. It should be noted that although the states Unverified, Verified, Running, and Committed, were used in the above example, any other states could also be used in the manner described. Thus, for example, the plurality of states may include at least a subset of Unverified, Verified, Deployed, Reserved, Committed, and Running, or their equivalents. In other words, the plurality of states may include one or more of the following state sequences: [Unverified, Verified, Reserved, Committed, Running], [Unverified, Verified, Deployed, Reserved, Committed, Running], [Unverified, Verified, Committed, Running], [Unverified, Verified, Reserved, Running], and [Unverified, Verified, Running]. It is noted that other collections of states are also contemplated for use in various embodiments of the present invention.

In one embodiment, the state model may comprise a task state model, i.e., a task-based state model, and the plurality of states may comprise a plurality of task states, each corresponding to a status of the task. A primary unique characteristic of the task-based state model is that the state model is not coupled to the state of the resources (e.g., devices), but instead is associated with a task.

The fact that the task state model relates specifically to aspects of the task as opposed to the measurement resources (i.e., hardware and/or software used to perform the task) may allow multiple measurement tasks to be performed efficiently. More specifically, the method may provide an efficient way to perform multiple measurement tasks which use common measurement resources.

For example, in one embodiment, the method may include receiving input specifying a plurality of sets of attributes for performing a corresponding plurality of measurement tasks, where each of the measurement tasks is in a first task state (e.g., an Initial state, such as Unverified, where the first task state indicates that customer-definable attributes have not been compiled and deployed). A corresponding plurality of run-times may then be generated based on the sets of attributes, thereby transitioning each of the tasks to a second task state (e.g., a Deployed state, such as Verified, where the second task state indicates that the customer-definable attributes have been compiled to primitive settings, and that the primitive settings have been received by corresponding primitive supervisors). A first run-time of the plurality of run-times may then be executed to perform a first measurement task of the plurality of measurement tasks using the one or more common hardware resources, thereby transitioning the first measurement task to a third task state (e.g., an Executing state, such as Running, where the third task state indicates that the one or more common hardware resources have been reserved and configured by the primitive supervisors and are performing the measurement task). In other words, the first measurement task may be performed using the common or shared resources. The execution of the first run-time may then be terminated, thereby transitioning the first measurement task back to the second task state (Deployed, or Verified).

The method may then iteratively execute and terminate others of the plurality of run-times to perform one or more respective other measurement tasks of the plurality of measurement tasks using the one or more common hardware resources. In other words, once the plurality of run-times have been generated, generally the most expensive part of the measurement process, each of the run-times may be executed and terminated in succession, where each execution transitions the respective task from the Deployed state to the Executing state, and each termination transitions the task from the Executing state back to the Deployed state. In this way, the task-based state model may provide great flexibility and efficiency in the performance of multiple measurement tasks. It is noted that the same approach may be used to iteratively perform a single measurement task, in that the run-time for the task may be executed and terminated repeatedly, without having to re-verify the task each time. It is further noted that the order of operations in preparing the plurality of run-times may vary. For example, attributes for a first task may be specified, then the task may be transitioned from the Initial state (e.g., Unverified) to the Deployed state (e.g., Verified) to generate the corresponding run-time. Then, a second task may be specified, followed by generation of the second run-time, and so on.

Thus, in one embodiment, the method may include specifying a first one or more attributes for performing a first measurement task, where the first task in a first task state, compiling the first one or more attributes into first one or more primitive settings, and deploying the first one or more primitive settings into a first run-time, thereby transitioning the first task to a second task state. Then, the method may include specifying a second one or more attributes for performing a second measurement task, where after specifying the second one or more attributes, the second task is in the first task state, compiling the second one or more attributes into second one or more primitive settings, and deploying the second one or more primitive settings into a second run-time, thereby transitioning the second task to the second task state.

The method may then proceed by executing the first run-time to perform the first measurement task using the one or more common hardware resources, thereby transitioning the first measurement task to a third task state, then terminating execution of the first run-time, thereby transitioning the first measurement task to the second task state. After terminating the first task, the method may continue, executing the second run-time to perform the second measurement task using the one or more common hardware resources, thereby transitioning the second measurement task to the third task state, and terminating execution of the second run-time, thereby transitioning the second measurement task to the second task state. Of course, in other embodiments, more that two tasks may be processed in this manner. Additionally, in other embodiments, the execution/termination steps may be performed iteratively, as described above.

In one embodiment, each of the plurality of task states may include one or more task sub-states, where each task sub-state comprises one or more state parameter values. For example, in one embodiment, each task state may include one or more tuples of state values, each tuple comprising: an attribute state, indicating a status for attributes in a measurement task specification which specifies the measurement task; a primitive settings state, indicating a status for parameter settings for measurement primitives which implement the measurement task specification, where the parameter settings are comprised in a run-time specification; and a run-time state, indicating a status for a run-time, where the run-time comprises a plurality of measurement primitives, and where each of the measurement primitives is operable to operate, communicate with, and/or control a measurement resource in the measurement system to perform the measurement task in accordance with the parameter settings. The transitions (both explicit and implicit) among the task states may thus comprise transitions among the task sub-states of the task states.

In one embodiment, the attributes which specify the task (i.e., the attributes included in the measurement task specification) may include customer-definable attributes. In other words, the customer may provide or specify the one or more attributes used to generate the primitive settings. In one embodiment, the customer may provide the attributes using a measurement task specifier, i.e., an interface program which leads the user through the task specification process.

One of the key benefits of the using task sub-states within each task state is that the user can reconfigure the task without explicitly transitioning the task back to an initial (e.g., Unverified) task state before reconfiguring the task or without explicitly transitioning the task back to the current task state after reconfiguring the task. In other words, the user is not forced to make explicit state transitions and leave the current task state when they reconfigure the task between operations. This may be accomplished by programmatic transitions between the task sub-states within a single task state when the task is reconfigured. Additionally, programmatic transitions between the task sub-states may be performed as a result of a successive operation (after reconfiguring) that results in a transition to a different task state. It is noted that task sub-state transitions within a task sub-state may be performed after the initial task specification but prior to performance of the task, or, after an initial performance of the task and subsequent reconfiguring of the task.

Thus, in various embodiments, the present invention includes a state model for a measurement system which may substantially improve performance and flexibility of the measurement system. Additionally, the inclusion of the state model in the measurement system may increase the usability of the system for the user by facilitating both user-specified state transitions and implicit state transitions in the implementation of a measurement task.

BRIEF DESCRIPTION OF THE DRAWINGS

A better understanding of the present invention can be obtained when the following detailed description of the preferred embodiment is considered in conjunction with the following drawings, in which.

Figure 1A:
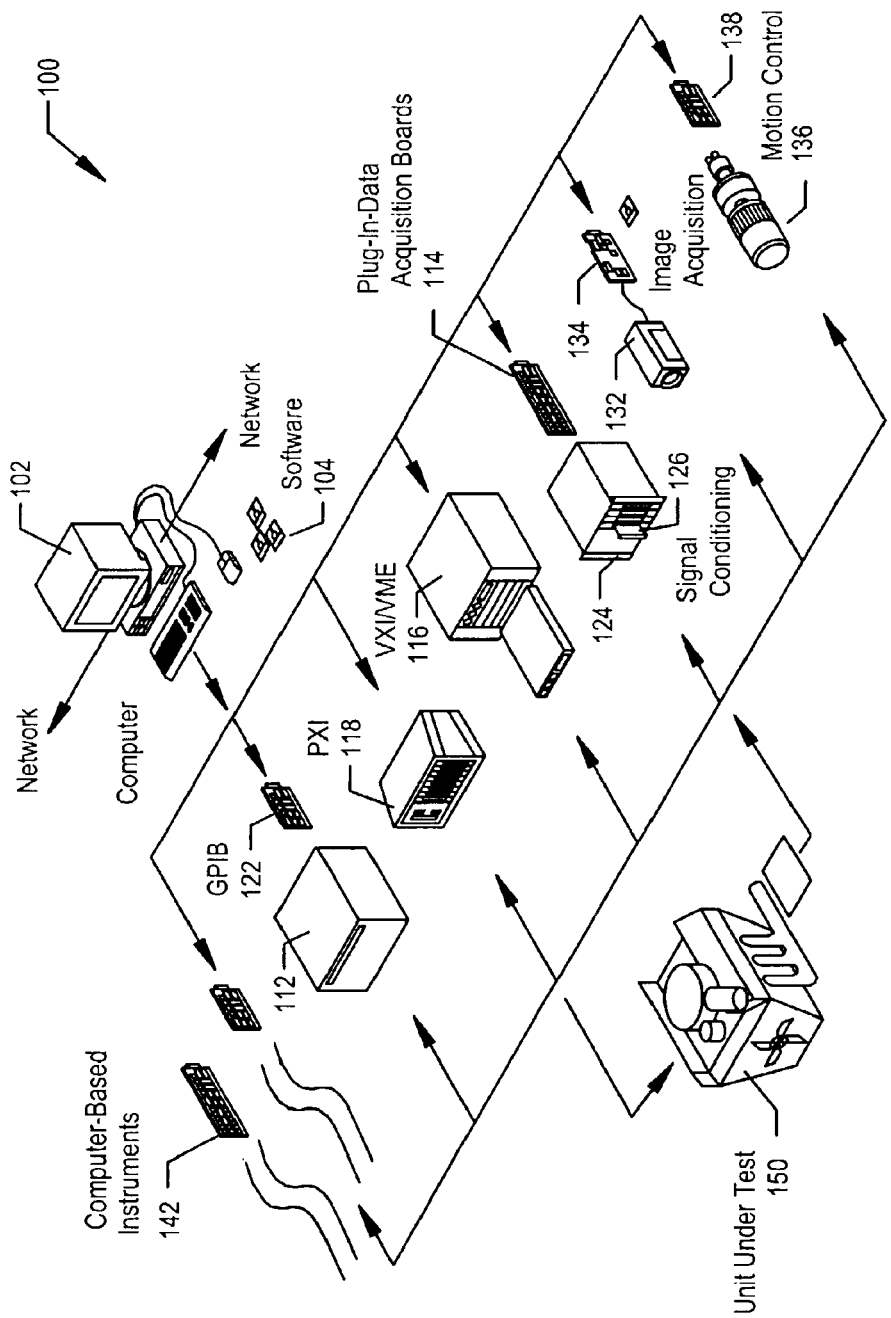
FIGS. 1A and 1B illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation By Reference

U.S. application Ser. No. 10/008,792 titled "Measurement System Software Architecture for Easily Creating High-Performance Measurement Applications" filed Nov. 13, 2001, currently pending, whose inventors were Geoffrey Schmit, Brent Schwan, Jonathan Brumley, Tom Makowski and Chris Bartz is hereby incorporated by reference in its entirety as though fully and completely set forth herein.

U.S. patent application Ser. No. 10/128,843 titled "Measurement System Graphical User Interface for Easily Configuring Measurement Applications", filed Apr. 24, 2002, currently pending, and whose inventors are Brian Johnson, John Breyer, and Joseph Albert Savage, is hereby incorporated by reference in its entirety as though fully and completely set forth herein.

Figure 1B:
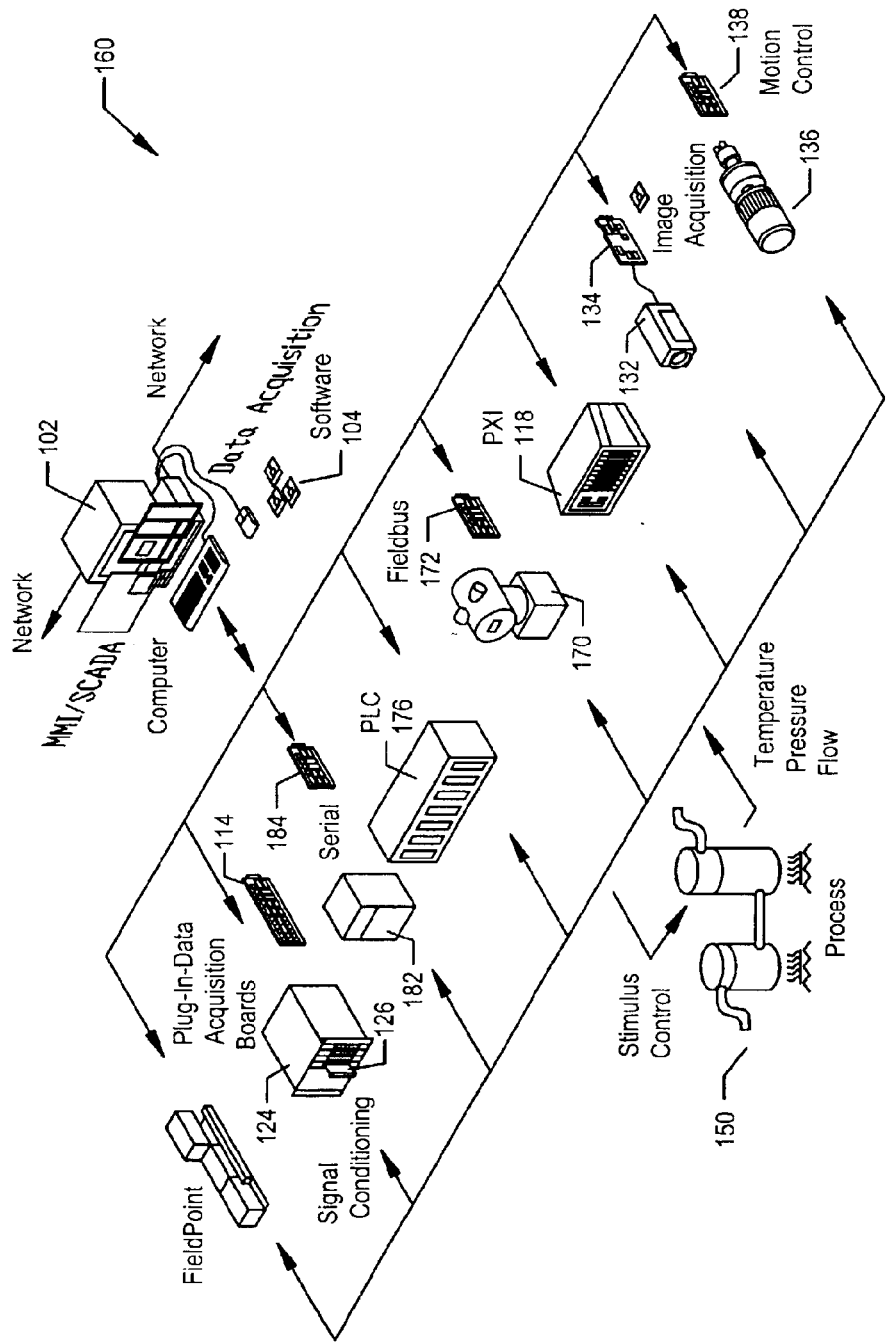

FIGS. 1A and 1B—Instrumentation and Industrial Automation Systems

FIGS. 1A and 1B illustrate exemplary measurement and automation systems. As used herein, the term "measurement system" is intended to include the types of measurement systems and automation systems shown in FIGS. 1A and 1B, as well as other types of systems. The measurement system shown in FIGS. 1A and 1B may include software programs according to one embodiment of the present invention. These programs may of course be stored in or used by other types of systems as desired. In accordance with one embodiment of the present invention, the present system and method includes a novel software architecture and novel software programs for allowing users to more easily create measurement and automation tasks (collectively referred to as "measurement tasks"), verify functionality, and easily create application code to implement desired tasks.

As used herein, the term "measurement system" is intended to include an instrumentation system such as that shown in FIG. 1A, an industrial automation system such as that shown in FIG. 1B, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation.

FIG. 1A illustrates an exemplary instrumentation control system 100. The system 100 may comprise a host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. These cards 122, 134, 138, 114 may also connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100 may be used in a data acquisition and control application, in a test and measurement application, a process control application, a man-machine interface application, or a simulation application.

FIG. 1B illustrates an exemplary industrial automation system 160. The industrial automation system 160 may be similar to the instrumentation or test and measurement system 100 shown in FIG. 1A. Elements which are similar or identical to elements in FIG. 1A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system 102 and/or one or more of the instruments or devices may include a memory medium (or memory mediums) on which software according to the present invention may be stored. The memory medium may store a development environment, such as National Instruments LabVIEW graphical development environment whereby measurement applications may be developed. Additionally, the memory medium may store one or more graphical programs which use a state model and one or more methods whose execution entails transitions between two or more states. In one embodiment, the memory medium may also store a measurement task specifier, an expert system, a plurality of experts, a run-time builder, and a plurality of measurement primitives, described in more detail below. Additionally, the memory medium(s) may store various products produced by or with these software components, such as a measurement task specification, a run-time specification, and a run-time, all of which are described in more detail in U.S. application Ser. No. 10/008,792 titled "Measurement System Software Architecture for Easily Creating High-Performance Measurement Applications" filed Nov. 13, 2001, which was incorporated by reference above. The memory medium(s) may also store configuration information for one or more of the above software programs.

The term "memory medium" is intended to include an installation medium, e.g., a CD-ROM, floppy disks 104, or tape device; a computer system memory or random access memory such as DRAM, SRAM, EDO RAM, RRAM, etc.; or a non-volatile memory such as a magnetic media, e.g., a hard drive, or optical storage. The memory medium may comprise other types of memory as well, or combinations thereof. Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In addition, the memory medium may be located in a first computer in which the shared library is stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested. However, it is noted that the present invention can be used for a plethora of applications and is not limited to instrumentation or industrial automation applications. In other words, FIGS. 1A and 1B are exemplary only, and the software programs and software architecture may be used for any of various purposes and may be stored in and execute on any of various types of systems to perform any of various applications.

Figure 2:
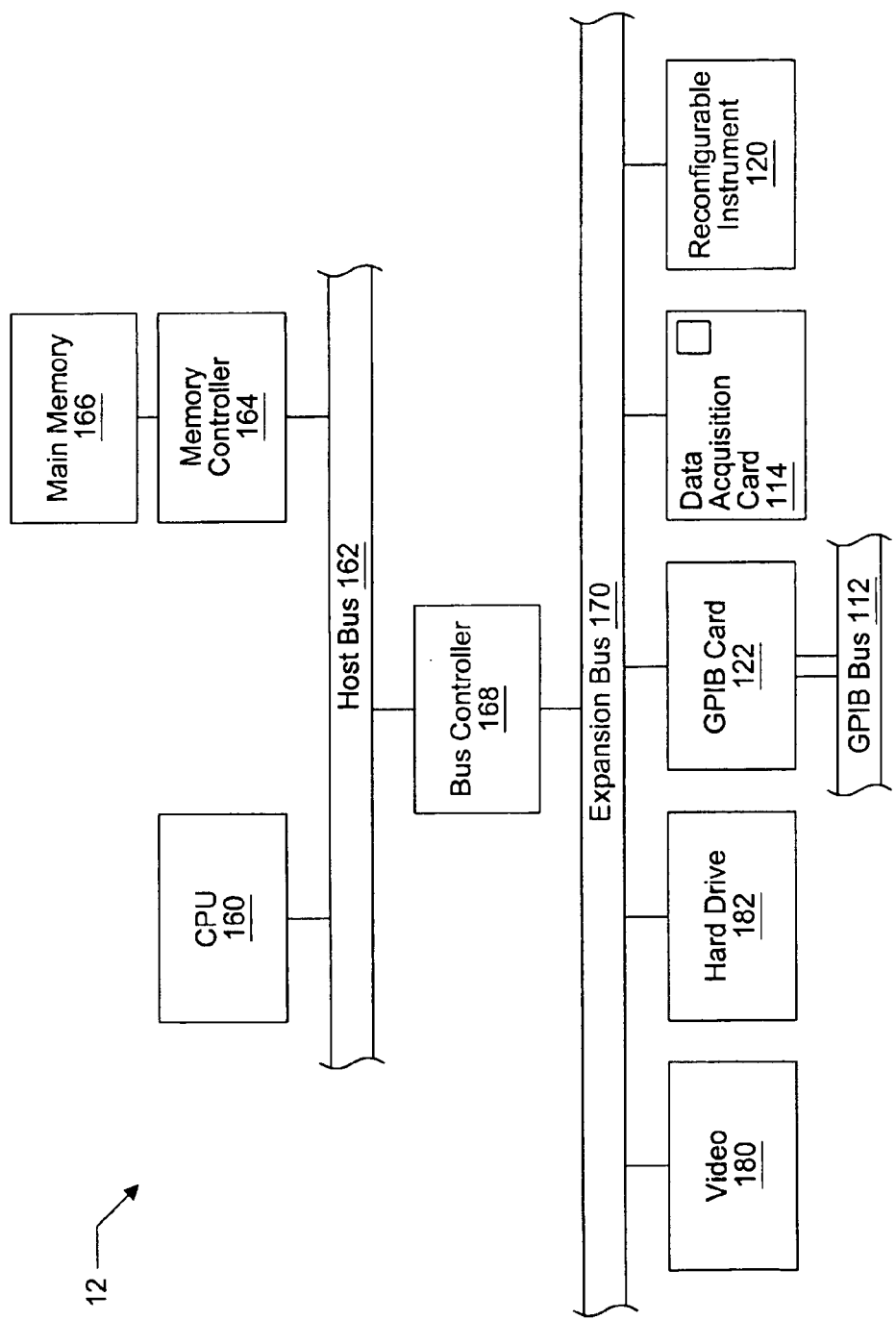
FIG. 2 is a block diagram of the computer system of FIGS. 1A and 1B, according to the prior art.

FIG. 2—Computer System Block Diagram

FIG. 2 is an exemplary block diagram of the computer system illustrated in FIGS. 1A and 1B. It is noted that any type of computer system configuration or architecture can be used in conjunction with the system and method described herein, as desired, and FIG. 2 illustrates a representative PC embodiment. It is also noted that the computer system may be a general purpose computer system such as illustrated in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A), a GPIB interface card 122 which provides a GPIB bus interface to the GPIB instrument 112 (of FIG. 1A), and a reconfigurable instrument 120. Note that as used herein, the term "reconfigurable instrument" refers to an instrument with one or more of:

1) a processor and memory which is capable of being configured by a user or software program; and/or 2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 3:
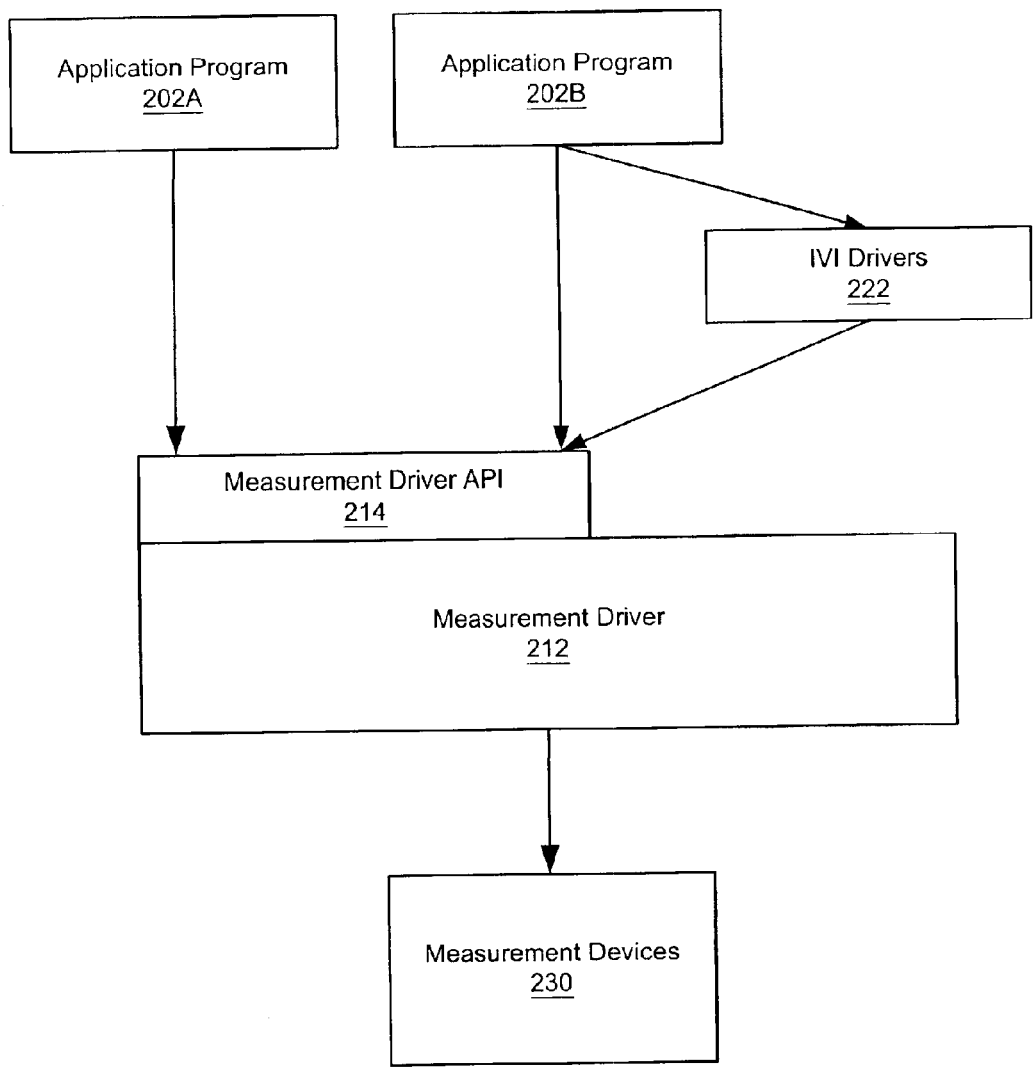
FIG. 3 illustrates one embodiment of a software architecture of a measurement system.

FIG. 3—High Level Architecture of a Measurement System

FIG. 3 illustrates one embodiment of a software architecture for a system, such as a measurement system, which may be suitable for implementing various embodiments of the present invention. As shown, the system may include one or more application programs 202. The application programs are typically developed by a user to accomplish a certain task or achieve a certain result. Thus, the application program is typically a user created or developed program to solve a desired problem or accomplish a desired result for the user. The application program 202 may be developed in any of various development environments. For example, the application program may be an application developed in the LabVIEW graphical programming environment of National Instruments Corporation. The application program 202 may also be developed in other applications, such as National Instruments Measurement Studio, Visual Basic, Visual C++, Delphi, or other programming development environments. Thus, the application program may be developed in graphical programming environments such as LabVIEW, or a text-based programming environment such as Measurement Studio or Visual Basic. The application program 202 may thus comprise the user's entire measurement system, and may include many more features and functions in addition to managing the particular measurement task specification and run-time generation, such as data analysis, report generation, or other higher-level functions of the measurement system.

As shown, the application 202 may communicate with a measurement driver 212. The measurement driver 212 may include a measurement driver application programming interface (API) 214. As shown, the application program 202A or 202B interfaces with the measurement driver API 214 in order to access capabilities of the measurement driver 212. In this measurement example, the software architecture may also include interchangeable virtual instrument (IVI) drivers 222 wherein the application program 202B may interface through IVI drivers 222, which interface with the measurement driver API 214, to interface with the measurement driver 212.

The measurement driver 212 may interface to the one or more various measurement devices 230, i.e., measurement resources, comprised in this system, including software and/or hardware devices. The measurement devices 230 may comprise any of the various devices discussed above with respect to FIG. 1A or 1B and may comprise other devices not shown in FIGS. 1A and 1B as desired. In one embodiment, at least one of the one or more measurement devices comprises a hardware measurement device. In another embodiment, at least one of the one or more measurement devices comprises a virtual measurement device.

In one embodiment, the present invention provides an improved system and method for performing tasks, such as measurement tasks, using a state model. The measurement driver 212 preferably includes various software programs that may implement and maintain a state model of one or more measurement tasks, allowing for improved control and flexibility in performing the measurement tasks, as described in detail below.

Figure 4:
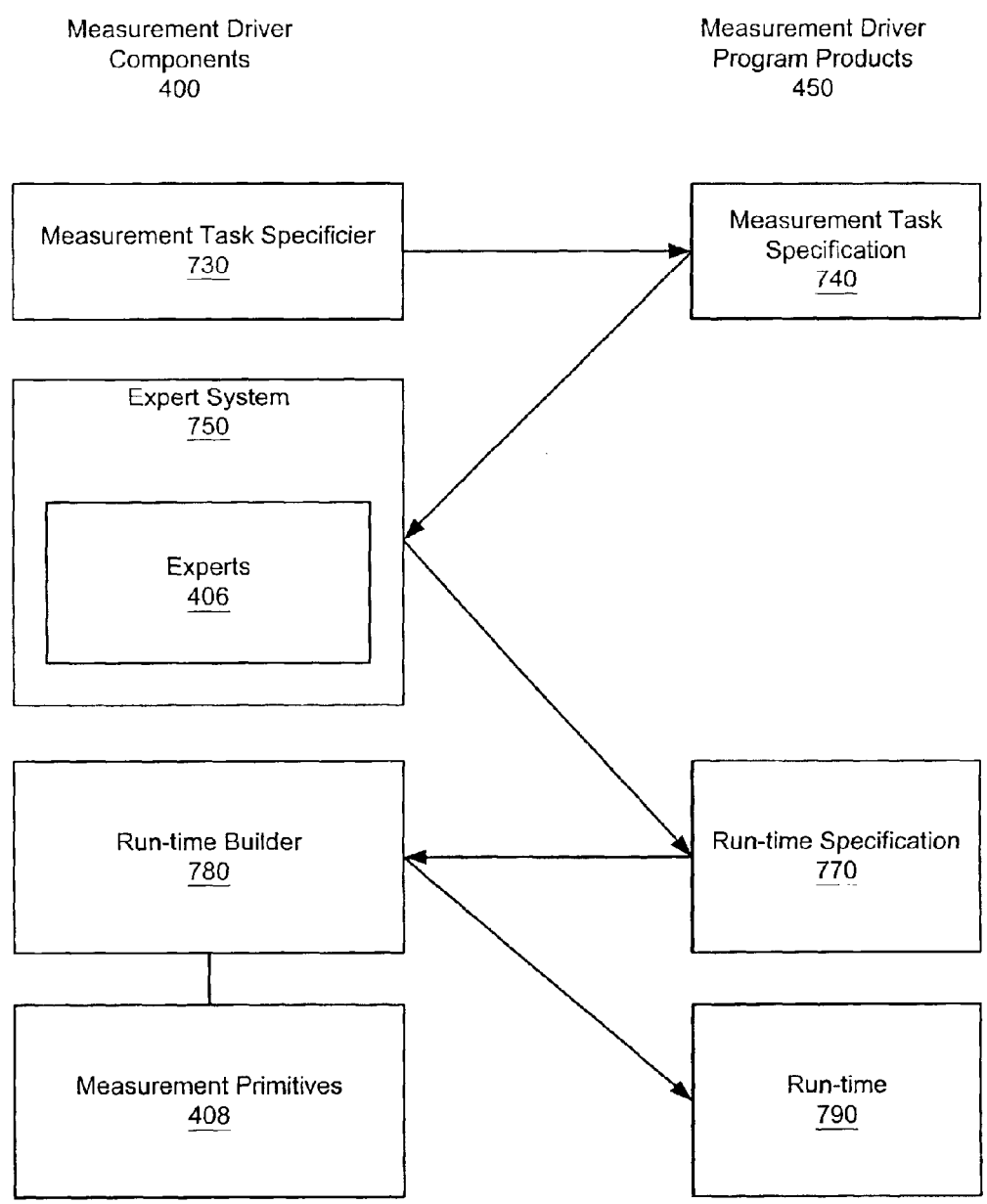
FIG. 4 illustrates measurement driver program components, according to one embodiment.

FIG. 4—Measurement Driver Program Components

FIG. 4 illustrates various software components or programs 400 comprised in the measurement driver program 212, according to one embodiment. It should be noted that the driver program components shown are but one approach to a driver architecture suitable for implementing the present invention, and that other embodiments are also contemplated. As shown, the measurement driver program 212 may include a measurement task specifier 730, an expert system 750 with one or more experts 406, a run-time builder 780, and various measurement primitives 408. The measurement driver 212 may also include other software components as well.

As FIG. 4 also illustrates, various of the measurement driver components may be operable to generate respective products which may be useable by other measurement driver components, by other software programs or systems, or by a user. More specifically, as shown in FIG. 4, in one embodiment, the measurement task specifier 730 may be operable to generate a measurement task specification 740. In one embodiment, the measurement task specification 740 may comprise software objects or data structures, such as C++ objects, containing one or more attributes which specify the measurement task. In one embodiment, the measurement task specifier 730 may be a measurement task wizard, i.e., a software program which leads the user through a measurement task specification process to create the measurement task specification 740. In another embodiment, the measurement task specifier 730 may take the form of a measurement task configuration tool, which is a software program invocable by the user under a development environment, such as the National Instruments LabVIEW environment or Measurement Studio programming development environment. In yet another embodiment, the measurement task specifier 730 may simply be an API through which the user makes calls to generate the task specification. Thus, in various embodiments, the measurement task specifier 730 may generate the measurement task specification 740 in response to user input.

As shown, the expert system 750 may use the measurement task specification 740 to generate a run-time specification 770. The expert system 750 may include a plurality of experts. The expert system 750 may include one or more experts for each of the measurement resource (device) types shown in FIGS. 1A and 1B, in addition to various other experts, including routing experts, streaming experts, and synchronization experts, among others. In one embodiment, the expert system 750 may operate to verify the measurement task specification, i.e., the one or more attributes specifying the measurement task.

In one embodiment, the run-time specification 770 may similarly comprise software objects or data structures, such as C++ objects, which may specify the run-time parameters for software and/or hardware used to implement the specified measurement task. The run-time specification 770 may comprise parameter specifications for one or more measurement primitives 408 which correspond to rudimentary measurement tasks or operations. Said another way, the run-time specification 770 may comprise a collection of primitive settings, each of which may comprise a detailed and unambiguous "recipe" for a primitive. For example, primitive settings for a digitizer, such as a National Instruments E-Series digitizer, may include: Dither (Yes, No), Polarity (Bipolar, Uni-polar), Gain, Mode (Calibration, Differential, Non-Referenced Single-Ended, Referenced Single-Ended, Auxillary, Ghost), Generate Trigger (Yes, No), and Last Channel (Yes, No).

The run-time specification 770 may in turn be interpreted by the run-time builder 780 to generate a run-time 790, which may be executable to perform the specified measurement task. More specifically, the run-time 790 may be executable to configure the installed measurement resources, e.g., measurement devices and/or software programs, to perform the measurement task, and to then perform the measurement task using the configured measurement resources, as described in detail below. The run-time may include a collection of measurement primitives, each of which may be operable to operate, communicate with, and/or control a particular measurement resource. In other words, each primitive may serve as an active interface for the corresponding measurement resource. In one embodiment, one or more of the primitives may have a primitive supervisor which manages the primitive. In another embodiment, the primitive itself may include the primitive supervisor, and thus, may supervise or manage itself. In an embodiment where a measurement resource is a software program, i.e., a virtual device, the measurement primitive may actually be the virtual device. Thus, in one embodiment, the primitive supervisors are those objects which are responsible for receiving the primitive settings and managing the primitives, and the measurement primitives are those objects which are responsible for managing the measurement resources. In some cases, the primitive supervisor and the measurement primitive may be the same object, although it may be useful to separate the concepts in order to decouple their responsibilities.

A first primitive supervisor may be linked to a second primitive supervisor by retrieving a reference to the second supervisor, thereby allowing the first primitive supervisor to collaborate with the second primitive supervisor. Similarly, measurement primitives may be linked to allow collaboration between them. A first measurement primitive may retrieve a reference to a second measurement primitive, the retrieval often being negotiated by the respective primitive supervisors, after which the measurement primitives may collaborate in the performance of the measurement task.

For more information regarding the measurement system architecture described above, please see U.S. application Ser. No. 10/008,792 titled "Measurement System Software Architecture for Easily Creating High-Performance Measurement Applications" filed Nov. 13, 2001, whose inventors were Geoffrey Schmit, Brent Schwan, Jonathan Brumley, Tom Makowski and Chris Bartz which was incorporated by reference above.

Figure 5:
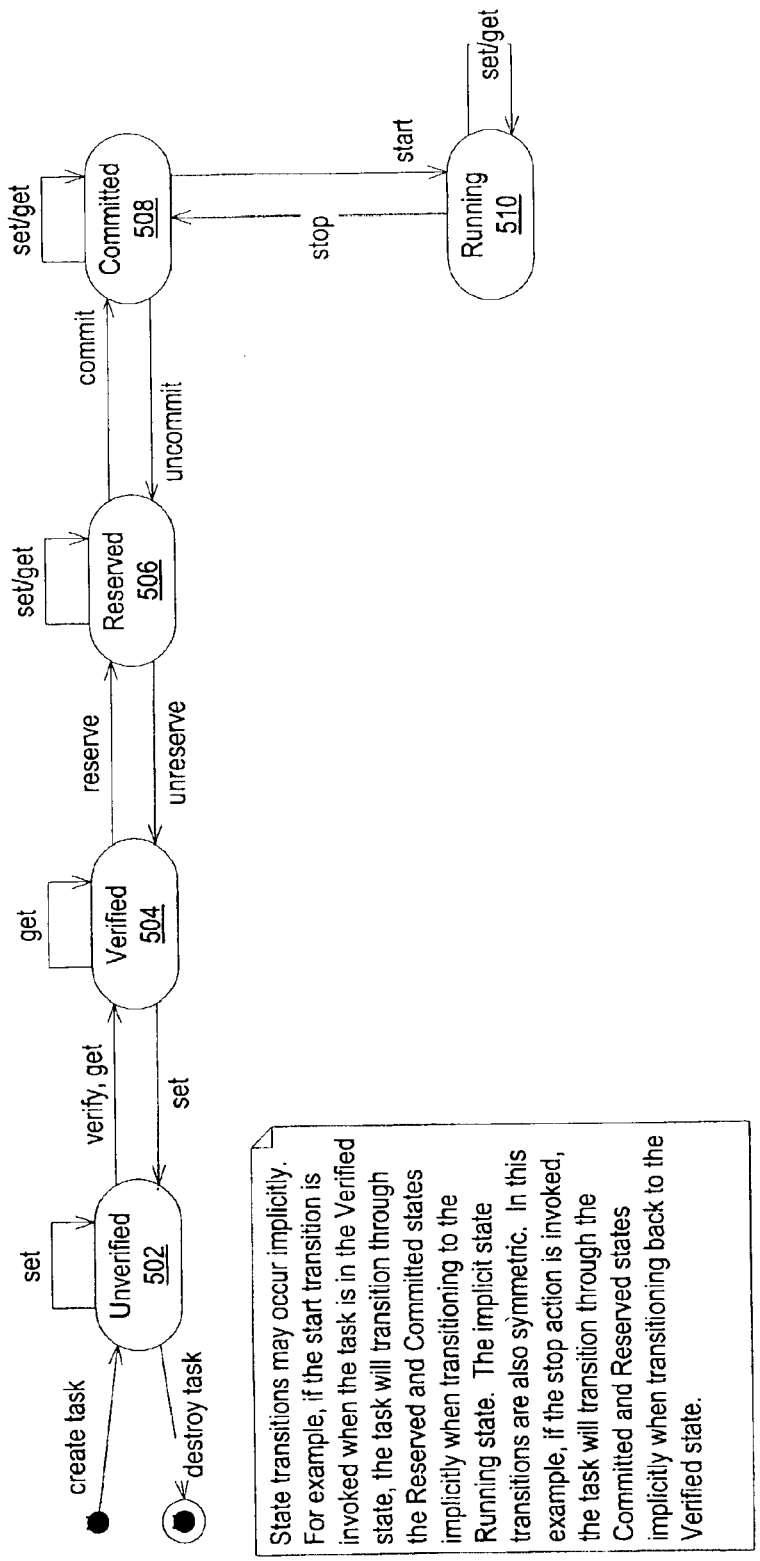
FIG. 5 is a state diagram for measurement tasks, according to one embodiment.

FIG. 5—Customer Task State Diagram

FIG. 5 is a diagram of one embodiment of a state diagram from the perspective of a customer or user of the measurement system. In other words, the state diagram shown presents states which are visible to a user of the system, but may include other, internal, states which may not be visible to the user, but which may be used to perform a measurement task. In a preferred embodiment of the invention, the state model relates to the status of the measurement task, in contrast with prior art systems whose state models described the status of measurement hardware installed in the system. In other words, the state model comprises a task state model, where the various states of the state model comprise task states indicating the status of a measurement task. This task-based approach to the state model may provide a number of benefits over the prior art, as will be discussed at length below.

It should be noted that the task states shown are meant to be exemplary only, and are not intended to limit the number or types of task states used in the measurement system to any particular number or states. For example, in one embodiment, a minimum number of states defined by the task state model may include an Initial state, a Deployed state, and an Executing state (or their equivalents). In one embodiment, the Initial state may comprise an Unverified state, where one or more attributes, e.g., customer-definable attributes, for the measurement system configuration have been specified, but have not been verified, and so may include errors. The Deployed state (or its equivalent) may indicate that the customer-definable attributes have been compiled into primitive settings which are usable to configure one or more measurement resources to perform the task. Finally, the Executing state (or its equivalent) may indicate that the measurement resources have been reserved, configured with the primitive settings, and are performing the measurement task. Thus, in one embodiment, the measurement system may include a task state model to perform a measurement task, where the task state model includes a plurality of task states. The measurement system may be operable to receive input specifying the measurement task, and transition from a first state of the plurality of task states to a second state of the plurality of task states to perform the measurement task. In other embodiments, these basic states may be broken out into a number of states that represent the status of the task at a higher resolution. The state diagram of FIG. 5 illustrates such an embodiment.

As FIG. 5 shows, in this embodiment, the task states visible to the user or customer may include:

Unverified—indicating that customer-definable attributes for the measurement system configuration have been specified, but have not been verified, and so may include errors, i.e., the task may not be valid;

Verified—indicating that the customer-definable attributes for the measurement system configuration have been verified and compiled to primitive settings, i.e., the task is valid;

Reserved—indicating that the measurement resources that will be used to perform the task have been exclusively acquired for the task, i.e., other tasks may not acquire these resources;

Committed—indicating that the measurement resources that will be used to perform the task have been configured or programmed in accordance with the primitive settings, and are now prepared to perform the task; and Running—indicating that the configured measurement resources are performing the task.

As FIG. 5 also shows, each task state has well-defined transitions to adjacent task states. A transition may be initiated via methods such as, for example, set, get, reserve, unreserve, commit, uncommit, start, and stop, among others. It is noted that in a preferred embodiment, the task states comprise a linear sequence, i.e., there is a well-defined order of the task states such that transitions between two non-adjacent task states may entail transitioning through intervening task states. This constraint gives rise to the idea of implicit state transitions, described below with reference to FIGS. 6 and 7A–7C.

It should be noted that in other embodiments, other sets of task states may be used by the state model. For example, one or more of the above-listed task states may be omitted or combined, resulting in state sequences such as (for example): [Unverified, Verified, Running], [Unverified, Verified, Reserved, Running], [Unverified, Verified, Committed, Running], and [Unverified, Verified, Deployed, Reserved, Committed, Running], among others. In other words, the task states may comprise a subset of [Unverified, Verified, Deployed, Reserved, Committed, and Running]. It is also noted that different state names may be used to denote these various states, i.e., as used herein, the particular states used are defined by function, not by any particular name.

As mentioned above, in one embodiment, the attributes which specify the task (i.e., the attributes included in the measurement task specification) may include customer-definable attributes. In other words, the customer may provide or specify the one or more attributes used to generate the primitive settings. In one embodiment, the customer may provide the attributes using a measurement task specifier, i.e., an interface program which leads the user through the task specification process. For further information regarding measurement task specifiers, please see U.S. patent application Ser. No. 10/128,843 titled "Measurement System Graphical User Interface for Easily Configuring Measurement Applications", filed Apr. 24, 2002, and whose inventors are Brian Johnson, John Breyer, and Joseph Albert Savage, which was incorporated by reference above.

Figure 6:
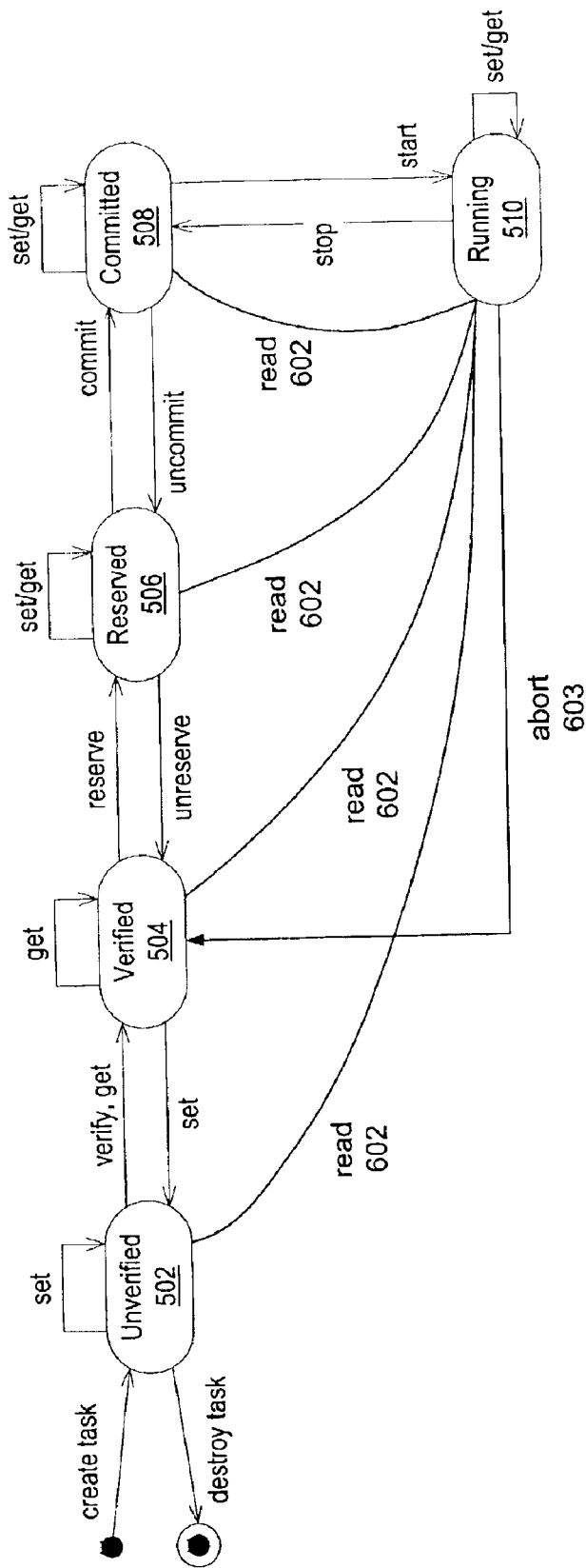
FIG. 6 illustrates implicit state transitions for the state diagram of FIG. 5, according to one embodiment.

FIG. 6—Implicit State Transitions

FIG. 6 illustrates implicit state transitions in the state diagram of FIG. 5, according to one embodiment. More specifically, FIG. 6 illustrates implicit state transitions as a consequence of the invocation of a read method from various initial or current states. In each case, invocation of the read method 602 causes one or more implicit state transitions leading to the Running state 510. Note that as used herein, the terms "programmatic" and "implicit" transitions mean that the transitions are determined and made without user input or user programming specifying the transitions. For example, if the user specifies or programs a read operation in the program, but when the read is to execute the task is not already in the correct state, the system may implicitly or programmatically transition the task to the correct state prior to executing the read, as opposed to the user having to specify or program the state transitions to bring the task to the correct state. In one embodiment, implicit or programmatic state transitions may not be apparent to the user. In other words, no indication may be given to the user that such transitions are occurring.

As FIG. 6 shows, if the task is in the Unverified state 502, then invocation of the read method 602 may lead to successive implicit transitions to Verified 504, Reserved 506, Committed 508, and finally, to Running 510. Similarly, if the task is in the Reserved state 506, then invocation of the read method 602 may lead to successive transitions to Committed 508, and to Running 510. As FIG. 6 also shows, if an abort transition 603 is invoked while the task is running, i.e., is in the Running state 510, the task may transition to the Verified state 504, implicitly transitioning through the Committed 508 and Reserved 506 states to do so.

It should be noted that other methods invoked by the user may involve other implicit state transitions. In other words, if a method's operation requires the task to be in a particular initial state, and the task is not in that state when the method is invoked, implicit transitions may be made from the current state, through any intervening states, to the appropriate initial state, after which the method may operate appropriately. The operation of the method may itself cause a state transition which may be effected after the implicit state transitions have been made. Additionally, in one embodiment, once the method operation is done, further implicit transitions may occur to take the task to a final state, e.g., back to the original "current" state from which the method was originally invoked. It should be noted that in some embodiments, the state model may include one or more states which are not visible to the user, and the implicit state transitions may include transitions to, from, and/or through these "hidden" states.

Thus, various operations of the measurement system may include one or more transitions between user-visible (or accessible) task states, as well as one or more implicit state transitions which may not be apparent to the user. Further details of implicit state transitions are presented below with reference to FIGS. 7A–7C.

Figure 7A:
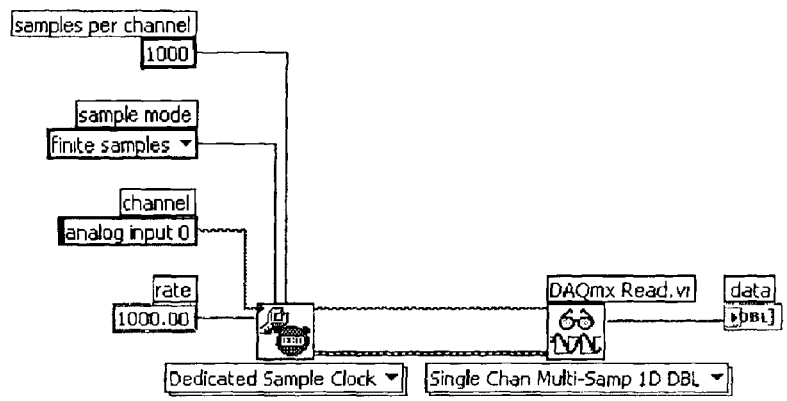
FIGS. 7A–7C are graphical programs illustrating implicit state transitions in the performance of a measurement task, according to one embodiment.
Figure 7B:
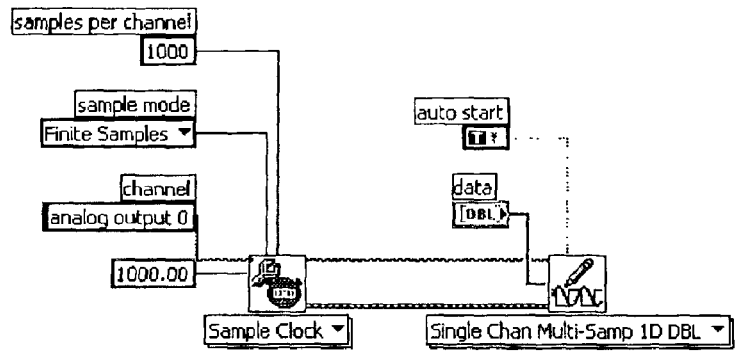
Figure 7C:
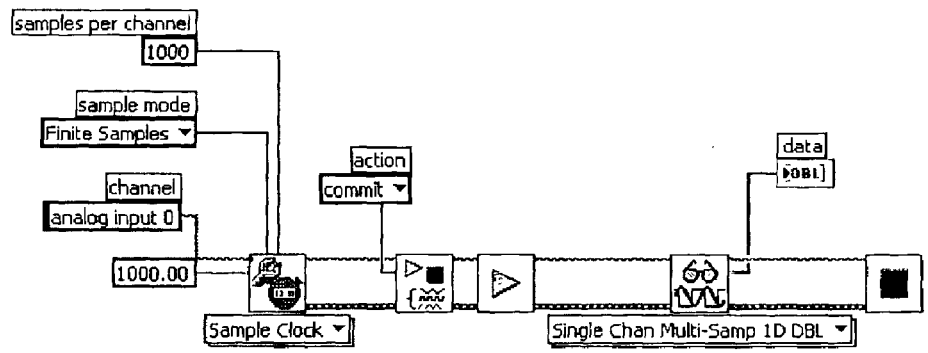

FIGS. 7A–7C—Example Graphical Programs With Implicit State Transitions

FIGS. 7A–7C are example block diagrams of graphical programs which illustrate implicit state transitions that occur as a consequence of various invoked methods, according to one embodiment. FIG. 7A specifically illustrates a graphical program in which an implicit transition to the Running 510 state is performed in response to invocation of a read operation. As FIG. 7A shows, the graphical program includes a read node, labeled "DAQmx Read.vi", which may be operable to read data which has been acquired by a DAQ device. Because the data must be acquired first, the task should be in the Running state 510 for the read operation to be performed. However, the task starts out in an Initial state, e.g., in the Unverified state 502. Thus, execution of the read node may cause or invoke a number of implicit state transitions of the task, leading to the Running state 510. In the embodiment of FIG. 6, the implicit state transitions are from Unverified 502 to Verified 504, from Verified 504 to Reserved 506, from Reserved 506 to Committed 508, and from Committed 508 to Running 510, at which time the read operation may be performed.

In one embodiment, once the read operation has been performed, the system may perform one or more implicit state transitions to return the task to a prior state. For example, the task may be transitioned to the original state of the system prior to execution of the read node, i.e., the task may be implicitly transitioned from Running 510, through Committed 508, Reserved 506, and Verified 504, to the Unverified state 502. In another embodiment, after the read operation has been performed, the task may be implicitly transitioned from Running 510, through Committed 508 and Reserved 506, to the Verified state 504. This may be a preferable "return" state because no attributes have been modified, and so no verification process is required. Returning the task to the Verified state 504 leaves the task in a state which provides great flexibility and efficiency for subsequent performance of the task, in that the potentially expensive verification step may be omitted for future runs of the task.

Another important operation typically performed by a measurement system is writing data that is output by the measurement system. For example, in the graphical program of FIG. 7B, a write node may be operable to write data to a device, e.g., to a signal generator. In many cases, the task must be in the Committed 508 or Running state 510 to perform the write operation because data that are written often must be transferred to a buffer on a hardware device. In other words, if the task is a signal generation task, then the signal generation hardware must receive a waveform prior to performing the signal generation. Transfer of the data (the waveform) may thus require that hardware be reserved and initialized. Therefore, if a request to write data is made and the task is in the Unverified 502, Verified 504, or Reserved 506 states, the task may be transitioned to the Committed state 508 implicitly. Once the task is committed, the write operation may be completed.

In some cases, a user may want the task to start the measurement system immediately after the write operation is complete. In other words, once the write operation has transferred the desired waveform to the signal generation hardware, the user may wish the system to automatically enter the Running state 510 so that the signal generation hardware may generate the signal based on the waveform. However, it may be difficult to know implicitly when a user desires this behavior. Therefore, in one embodiment, the write node may include an input parameter that allows the user to specify a transition to the Running state 510 (or any other state) once the write is complete.

In the graphical program shown in FIG. 7B, invocation of the write operation may first cause an implicit transition to the Committed state 508, then, after the write operation is completed, an explicit transition to the Running state 510 may be performed based on the input parameter, indicated by the Boolean auto start input parameter coupled to the write node. Thus, execution of the write node may include the write node (or code associated with the write node) checking a value of the auto start parameter, and if the parameter so indicates, explicitly transitioning the task from Committed 508 to Running 510. Thus, the auto start parameter may cause an explicit post operative transition from the current state, i.e., the Committed state 508, to a target state, i.e., the Running state 510. In other embodiments, the input parameter may be used to specify a post-operation explicit state transition to any other state, as desired. It should be noted that in a case where the specified post operative target state is not adjacent to the current state, one or more implicit state transitions may be performed in transitioning the task from the current state to the target state. It is further noted that such transitions may be performed in conjunction with other functional nodes besides write nodes, e.g., read nodes, stop nodes, etc.

In one embodiment, users that are interested in the various task states can make transitions explicitly by using graphical programming nodes. For example, a transition from the Committed state 508 to the Running state 510 may be made by using a "Start" graphical programming node, as represented in the graphical program of FIG. 7C by a node labeled "DAQmx Start.vi". Similarly, a transition from the Running state 510 to the Committed state 508 may be made using a "Stop" graphical programming node, labeled "DAQmx Stop.vi" in FIG. 7C. In the embodiment shown, other state transitions may be made using a "Task Control" graphical programming node, labeled "DAQmx Task Control.vi". For example, the Task Control node receives an input parameter specifying a transition of the task to the Committed state 508. Thus, FIG. 7C illustrates a graphical program that explicitly transitions the task to the Committed state 508 (via the Task Control node), then to the Running state 510 (via the Start node), where a read operation is performed, and back to the Committed state 508 (via the Stop node).

As mentioned above, when the graphical program begins execution, the task may be in an Initial state, e.g., the Unverified state 502, which may not be adjacent to (and prior to) the target state (Committed 508). Thus, the explicit state transition to Committed 508 specified by the Task Control node may necessitate implicit transitions from Unverified 502, through Verified 504, to Reserved 506, before the explicit transition to Committed 508 may be performed. In other words, the node may implicitly or programmatically transition the task from it's current state to a suitable state for the node's operation, in this example, an explicit transition to the Committed state 508.

Similarly, when the Start node is executed, if the task is not in the state just prior to Running 510, one or more implicit transitions may be performed. However, it is noted that in this example, the Task Control node explicitly transitions the task to Committed 508 (which is the state just prior to the Running state 510, and thus, no implicit transitions are required for the Start node to execute.

In one embodiment, execution of the Stop node may result in a transition to the last explicit task state prior to the execution of the Start node. In the example shown in FIG. 7C, where a read node is placed between the Start node and the Stop node, the prior state is the Committed state 508. Thus, execution of the Stop node may include, in addition to terminating operation of the relevant measurement resource(s), transitioning the task back to the Committed state 508. In the case where the prior state is not an adjacent state to the Running state 510, the transition from the Running state 510 to the prior state may include one or more implicit state transitions.

Thus, the execution of various graphical program nodes may perform or cause to be performed explicit state transitions, as well as one or more implicit task state transitions. Some of these implicit transitions may be affected by input parameters to the nodes specifying explicit state transitions for the task, where explicit transition between non-adjacent task states may include one or more implicit transitions through intervening task states.

Further benefits of implicit state transitions are presented below in the section titled "Benefits of Implicit State Transitions".

Figure 8:
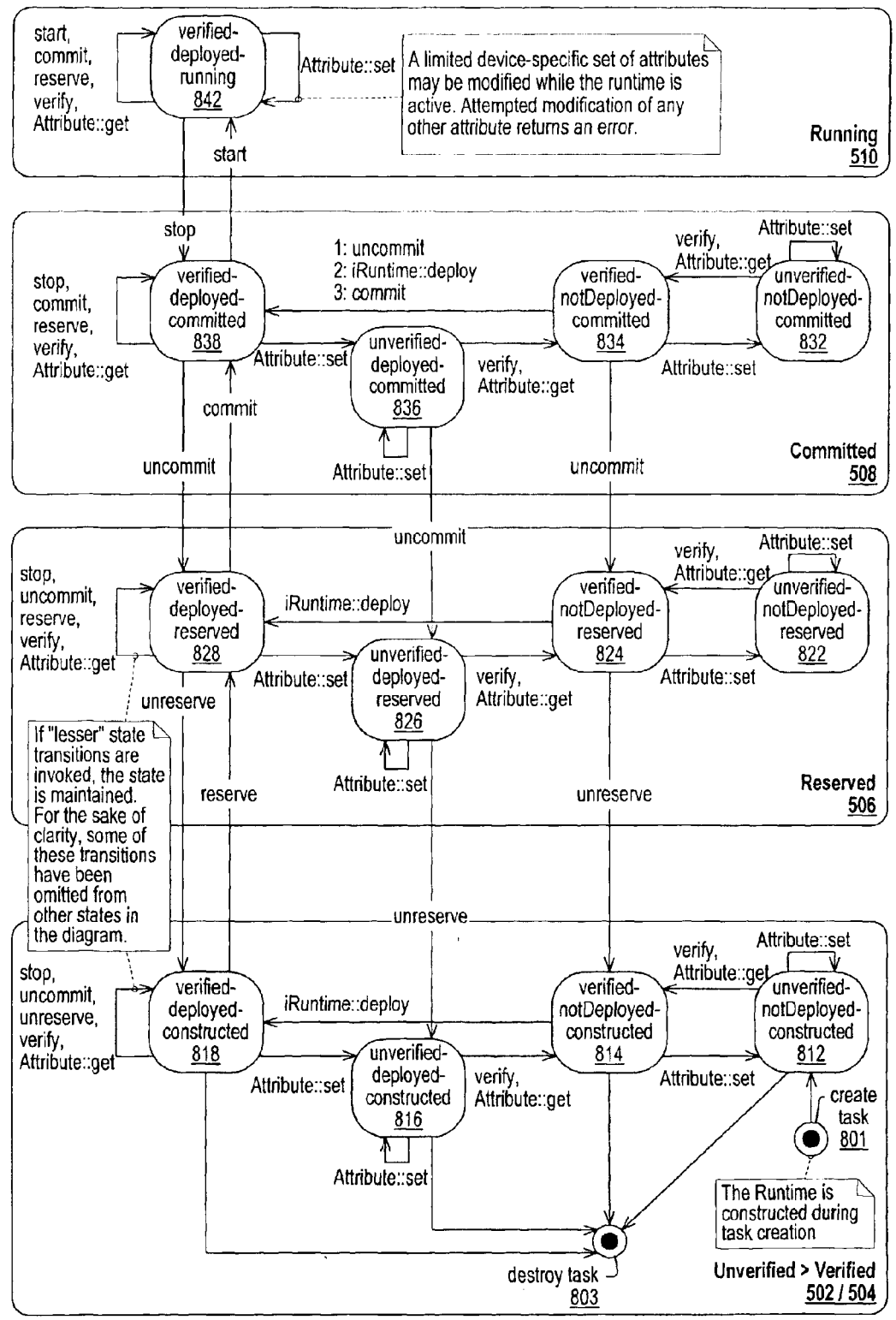
FIG. 8 is a detailed task state diagram for measurement tasks, according to one embodiment.

FIG. 8—Sub-states in the State Model

In one embodiment, the various task states, e.g., Unverified 502, Verified 504, Reserved 506, Committed 508, and Running 510 (or their equivalents), may comprise a number of sub-states which may indicate the status of components of the measurement task, and thus represent the task status at a higher resolution. FIG. 8 illustrates an embodiment of a state diagram in which the sub-states of each task state comprise tuples of state parameter values, where each tuple includes an attributes state, a primitive setting state, and a run-time state. This approach follows from the fact that in one embodiment, a measurement task may include one or more attributes, e.g., user-definable attributes, which specify the desired measurement task, one or more primitive settings based on the attributes, and one or more measurement primitives which provide a communication and control interface with respective measurement resources.

Said another way, each of the plurality of task states may include one or more task sub-states, where each task sub-state includes one or more state parameter values. In one embodiment, the state parameter values may include:

an attribute state, indicating a status for the attributes in a measurement task specification that specifies the measurement task;

a primitive settings state, indicating a status for primitive settings for measurement primitives, where the primitive settings are produced from the attributes and implement the measurement task specification, and where the primitive settings are included in a run-time specification; and a run-time state, indicating a status for a run-time, where the run-time includes a plurality of the measurement primitives, each of which may be operable to operate, communicate with, and/or control a measurement resource in the measurement system to perform the measurement task in accordance with the primitive settings.

In this embodiment, the transitions among task states described above may include transitions among the sub-states of the task states.

In various embodiments, the task sub-state parameter values may be defined to denote the status of the respective aspects of the measurement task, examples of which are presented below.

Examples of attribute states may include, but are not limited to:

unverified—indicating that one or more of the specified attributes have not been verified and compiled to primitive settings; and verified—indicating that all of the specified attributes have been verified and compiled to primitive settings.

Examples of primitive settings states may include, but are not limited to:

not deployed—indicating that at least one primitive setting has not been deployed in the run-time; and deployed—indicating that all of the primitive settings have been deployed in the run-time.

Examples of run-time states include, but are not limited to:

constructed—indicating that measurement primitives (and/or primitive supervisors) have been constructed, initialized with primitive settings, and linked with other primitive supervisors;

reserved—indicating that measurement resources for performing the measurement task have been acquired, and optionally, that links to other hardware primitives have been resolved;

committed—indicating that the configuration (i.e., the primitive settings) has been committed to hardware and the configured hardware is ready to run; and running—the configure hardware and software are actively operating in the system to perform the measurement task, e.g., acquiring or generating data.

For example, in the state diagram of FIG. 8, the Unverified state 502 includes sub-states denoted by the following tuples: (unverified-deployed-constructed) 816 and (unverified-notDeployed-constructed) 812, indicating the respective status of the attributes, the primitive settings, and the run-time, for the task in the Unverified state 502. As FIG. 8 also shows, the Verified state 504 includes sub-states denoted by the following tuples: (verified-deployed-constructed) 818 and (verified-notDeployed-constructed) 814.

Similarly, the Reserved state 506 includes a plurality of sub-states, namely, (unverified-notDeployed-reserved) 822, (verified-notDeployed-reserved) 824, (unverified-deployed-reserved) 826, and (verified-deployed-reserved) 828. As FIG. 8 shows, the Committed 508 and Running 510 states similarly include sub-states reflecting attribute/primitive settings/run-time status. It should be noted that the sub-state parameter values relate to specific task components, and should not be confused with similarly named task states, e.g., the "Reserved" sub-state parameter and the Reserved task state 506.

As FIG. 8 shows, transitions between sub-states may be made by invoking various task, attribute, and run-time methods. Examples of task methods include start/stop, commit/uncommit, reserve/unreserve, and verify, among others. Examples of attribute methods include set and get. It should be noted that transitions between sub-states belonging to different task states are the task state transitions described above, and that, as FIG. 8 shows, there may be multiple ways to transition between task states. For example, a task state transition from Committed 508 to Reserved 506 may be made by transitioning from the Committed sub-state (unverified-deployed-committed) 836 to the Reserved sub-state (unverified-deployed-reserved) 826, or alternatively, by transitioning from the Committed sub-state (verified-notDeployed-committed) 834 to the Reserved sub-state (verified-notDeployed-reserved) 824, as shown.

Note that when an attribute is modified, e.g., with an attribute::set( ), a transition may be made to a sub-state which includes the "Unverified" state parameter. Similarly, invocation of a verify method may result in a transition to a sub-state which includes the "Verified" state parameter. Execution of the run-time method iRuntime::deploy may result in a transition to a sub-state which includes the "deployed" state parameter. Thus, the task, run-time, and attribute methods may each correspond to one or more sub-state transitions reflecting a new or changed status of a corresponding task component. Where such sub-state transitions span a task state boundary, a task state transition occurs.

One of the key benefits of the using task sub-states within each task state is that the user can reconfigure the task without explicitly transitioning the task back to an initial (e.g., Unverified) task state before reconfiguring the task or without explicitly transitioning the task back to the current task state after reconfiguring the task. In other words, the user is not forced to make explicit state transitions and leave the current task state when they reconfigure the task between operations. This may be accomplished by programmatic transitions between the task sub-states within a single task state when the task is reconfigured. Additionally, programmatic transitions between the task sub-states may be performed as a result of a successive operation (after reconfiguring) that results in a transition to a different task state. It is noted that task sub-state transitions within a task sub-state may be performed after the initial task specification but prior to performance of the task, or, after an initial performance of the task and subsequent reconfiguring of the task.

For example, if the user wishes to perform a sequence of operations with the same task, but make minor changes to the configuration of the task between operations, the following sequence of operations may be performed:

1. Configure the task. The task is in the initial, "Unverified" task state, e.g., ({unverified-notDeployed-constructed}).

2. Explicitly transition the task to the "Reserved" task state, resulting in the task transitioning through the "Verified" task state to the "Reserved" task state,
e.g., ({unverified-notDeployed-constructed}->{verified-notDeployed-constructed}->verified-deployed-constructed}->{verified-deployed-reserved}).

3. Execute the task to perform the first operation, resulting in the task transitioning to the "Running" task state, performing the operation, and returning to the "Reserved" task state,
e.g., ({verified-deployed-reserved}->{verified-deployed-committed}->{verified-deployed-running}->{verified-deployed-committed}->{verified-deployed-reserved}).

4. Reconfigure the task to prepare for the next operation to be performed by the task, e.g., by setting one or more attributes of the task. Note that from the user's perspective, the state of the task has not changed after this reconfiguration; the task is still in the "Reserved" task state. However, internally, the task sub-state has changed,
e.g., ({verified-deployed-reserved}->{unverified-deployed-reserved}).

5. Execute the task to perform the second operation, again resulting in the task transitioning to the "Running" task state, performing the operation, and returning to the "Reserved" task state. From the user's perspective the task transitions through the same series of task states as when executing the first operation. However, internally, additional task sub-state transitions may occur to handle the reconfiguration of the task,
e.g., ({unverified-deployed-reserved}->{verified-notDeployed-reserved}->{verified-deployed-reserved}->{verified-deployed-committed}->{verified-deployed-running}-> {verified-deployed-committed}->{verified-deployed-reserved}).

In one embodiment, these additional task sub-state transitions may be optimized to only verify those attributes that are affected by the reconfiguration of the task. Additionally, they may be optimized to only re-deploy those primitive settings that have changed as a result of the reconfiguration of the task. These additional sub-state transitions may enable both high-performance reconfiguration of the task and improved usability for the user.

In one embodiment, the task states available to the measurement task comprise a state space, where each task state corresponds to a point or location in the state space. For example, in one embodiment, the task state space is a three-dimensional space organized along the axes: Expert Attributes, Expert Primitive Settings, and Run-Time, corresponding respectively to the state parameters described above. In this embodiment, points within the state space may be written as: (<Expert Attributes coord.>, <Expert Primitive Settings coord.>, <Run-Time coord.>). It is noted that while the state space is potentially large, in reality only a small number of states may actually be reachable.

Figure 9A:
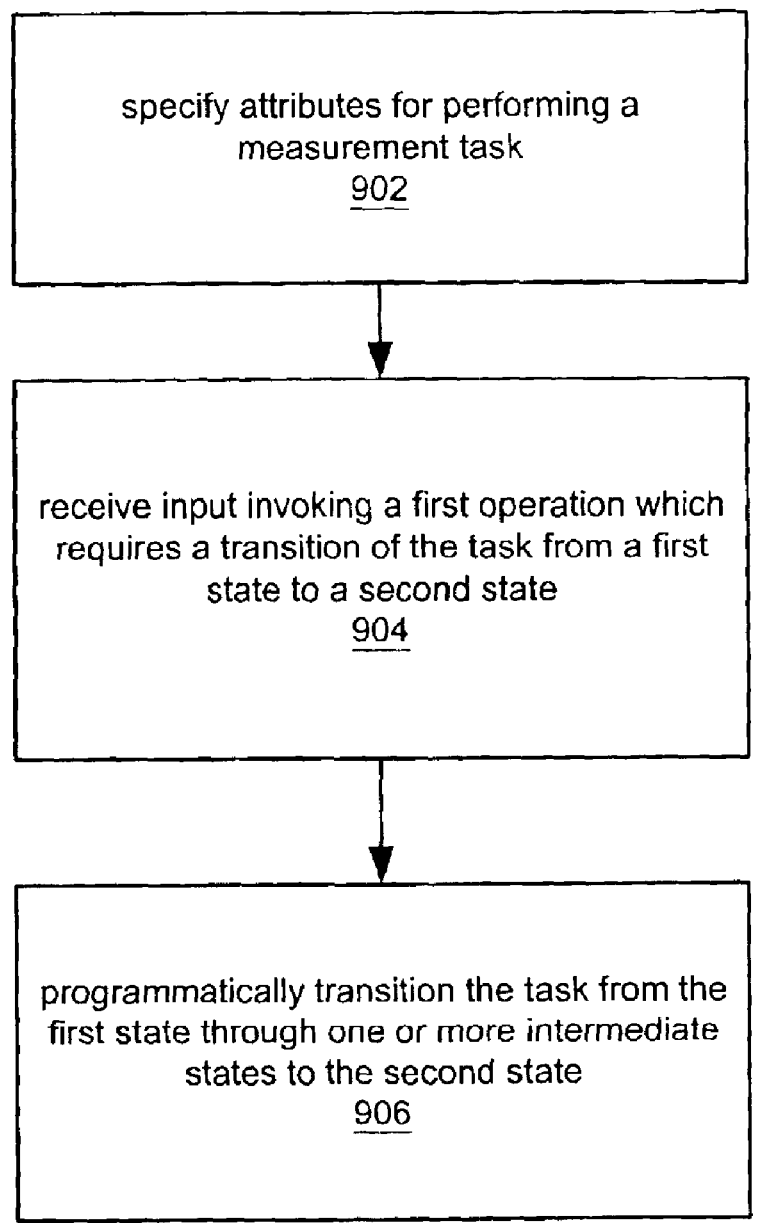
FIGS. 9A and 9B flowchart various embodiments of a method for using a state model to perform a measurement task.
Figure 9B:
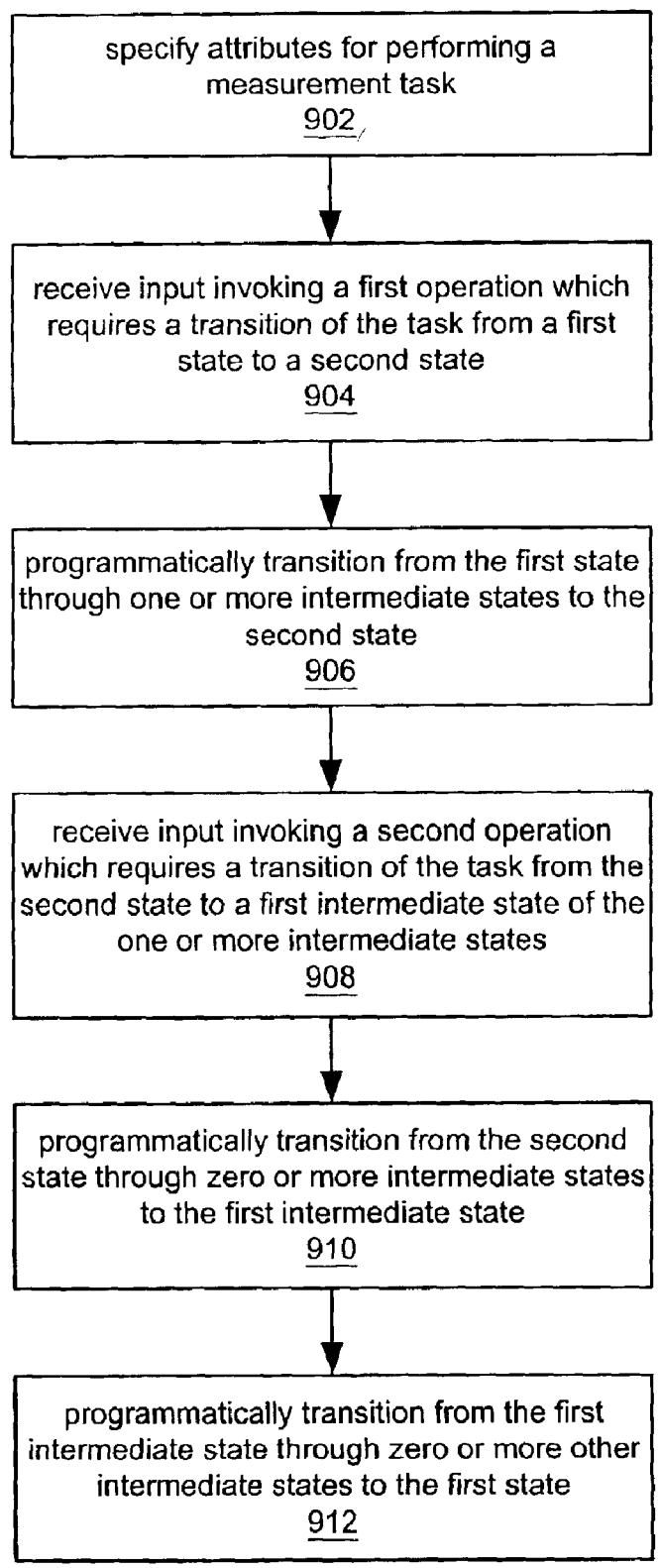

FIGS. 9A and 9B—Methods for Performing a Measurement Task

FIGS. 9A and 9B are flowchart diagrams illustrating embodiments of a method for using a state model to perform a measurement task, the method being used to configure installed measurement resources, i.e., hardware (and/or software) devices, and to perform the measurement task using the configured measurement resources. It is noted that the flowcharts of FIGS. 9A and 9B are exemplary only. Further, various steps in the flowcharts of FIGS. 9A and 9B may occur concurrently or in different order than that shown, or may not be performed, as desired. Also, various additional steps may be performed as desired. Is should be noted that in various embodiments, the methods presented in FIGS. 9A and 9B, as well as in FIG. 10, described below, may be implemented in graphical programs, where the various operations, methods, and state transitions are performed by graphical program nodes. Specific examples of graphical programs using nodes to perform measurement tasks using state transitions are described above with reference to FIGS. 7A–7C, and also with reference to FIGS. 11A and 11B, described below.

FIG. 9A flowcharts one embodiment of a method for using a state model to facilitate implicit state transitions in the performance of a measurement task. As FIG. 9A shows, in 902, one or more attributes may be specified for performing the measurement task. For example, in one embodiment, the one or more attributes may be included in a measurement task specification, as described above. In one embodiment, specifying the one or more attributes may simply entail modifying one or more attributes of a previously specified measurement task. Once the attributes have been specified, the task may be in a first task state, e.g., in the Unverified state 502.

In 904, input may be received invoking a first operation or method which requires a transition of the task from the first task state to a second task state. For example, as described above with reference to FIG. 7A, a read function may be invoked which requires the task to be in the Running state 510.

In response to the method invocation, the task may be programmatically transitioned from the first task state, through one or more intermediate task states, to the second task state, as indicated in 906. For example, in the case of the read invocation of 904, the task may be programmatically transitioned from the Unverified state 502, through the Verified 504, Reserved 506, and Committed 508 states, to the Reserved state 510, whereupon the read function may then operate to read data.

Is should be noted that although the above method is described using a task state model with task states, it is also contemplated that such implicit state transitions may be implemented in a measurement system which does not specifically utilize task states. In other words, the performance of implicit state transitions in a measurement system may be used in more traditional measurement systems which use state models based on the status of the measurement resources or other aspects of the system (as opposed to the task).

In one embodiment, prior to specifying the attributes for the measurement task, one or more measurement resources may be installed in the measurement system to perform the task. In other embodiments, the measurement resources may be installed after the attributes have been specified. Installation of the measurement resources may include connecting a measurement device to the computer system or installing a measurement card or board within a slot of the computer system. This may further comprise installing a measurement card or board in a slot of a chassis, such as a PXI chassis, which itself is coupled to the computer system and/or which may contain a computer system comprised on a card within the chassis. In one embodiment, the measurement hardware may comprise a "reconfigurable measurement device" which may be operable to be reconfigured "on the fly" during a measurement task or operation. For example, the reconfigurable measurement device may include a processor and memory or an FPGA that may be reconfigured with different measurement programs or tasks. In other embodiments, installing the measurement resources may include installing one or more measurement programs on the computer system.

FIG. 9B flowcharts an embodiment of the method of FIG. 9A where additional state transitions are performed. The first three steps of the method are substantially the same as the steps of the method of FIG. 9A, and so the descriptions are abbreviated. It is noted, however, that in this embodiment, the first or Initial state of 902 is the Verified state 504, as opposed to the Unverified state 502 used in the embodiment of FIG. 9A. It is further noted that any of the methods presented herein may be implemented by graphical programs, e.g., LabVIEW graphical programs.

In 902, one or more attributes may be specified for performing the measurement task, e.g., in a measurement task specification, after which the task may be in a first state, e.g., in the Verified state 502 (although any other state may also be considered for use in the same way).

In 904, input may be received invoking a first operation or method which requires a transition of the task from the first state to a second state, e.g., a Read function which requires the task to be in the Running state 510. In one embodiment, the input may be provided by a user. In another embodiment, a Read node may be executed in the graphical program.

In response to the method invocation, the task may be programmatically transitioned from the first state, through one or more intermediate states, to the second state, as indicated in 906. For example, as described above, in the case of the read invocation of 904, the task may be programmatically transitioned from the Verified state 504, through the Reserved 506 and Committed 508 states, to the Running state 510, whereupon the Read function may then operate to read data, e.g., from a measurement resource, such as a DAQ device.

After transitioning the task to the second state, in 908 input may be received, e.g., from the user, invoking a second operation or method which requires a transition of the task from the second state to a first intermediate state of the one or more intermediate states. In other words, the operation requires the task to transition back to one of the intermediate states of 906.

Then, in 910, the task may be programmatically transitioned from the second state, through zero or more intermediate states, to the first intermediate state. For example, in the read example from above, in 908, the input may invoke a "Stop" method to terminate the read operation. The Stop method may then terminate operations of the measurement resource, transitioning the task from the Running state 510 (or its equivalent) to the first intermediate state, e.g., to the Committed state 508.

Finally, in 912, the task may be programmatically transitioned from the first intermediate state, e.g., the Committed state 508, through zero or more other intermediate states, back to the first state. For example, in one embodiment, the task may be programmatically transitioned through the Reserved 506 state to the Verified state 504, which was the last explicit state of the task prior to the invocation of the initial operation (the Read method). In another embodiment, the first state (of 902) may be the Unverified state 502 (as opposed to the Verified state 504), and for reasons of efficiency, the final (programmatic or implicit) transition may be to the Verified state 504, in that transitions to the Unverified state 502 generally correspond to modifications in the task attributes, and since no attributes have been modified, transitioning to the Unverified state 502 may be unnecessary.

In another embodiment, the user may modify one or more of the attributes for the task, thereby transitioning the task back to the Unverified state 502. Subsequent performances of the measurement task may then necessitate transitioning back through the Verified state 504 before further measurement operations are performed.

Thus, in one embodiment, the method may operate to perform a first function or operation which may include one or more implicit state transitions, then to perform a second function, which may result in further implicit transitions of the task. More specifically, the implicit transitions may return the task to the original state (which may be any of the task states) from which the first operation was invoked. Thus, from the user's perspective, the system receives the user's method request(s), performs the requested function(s), and returns the task to the original state, and so the numerous state transitions described above may effectively be hidden from the user. In other words, when an explicit state transition is requested, e.g., through a graphical programming node, as many implicit state transitions as are necessary may be made to put the task into the requested state, and as a result, users do not have to think about the current state when requesting an explicit state transition.

As mentioned above, although the above method is described using a task state model with task states, it is also contemplated that such implicit (i.e., programmatic) state transitions may be implemented in a measurement system which does not specifically utilize task states. In other words, the use of implicit state transitions in a measurement system may be used in more traditional measurement systems which use state models based on the status of the measurement resources or other aspects of the measurement system (as opposed to the task itself). It should be noted that although the states Verified, Running, and Committed, were used in the above example, any other states could also be used in the manner described.

Figure 10:
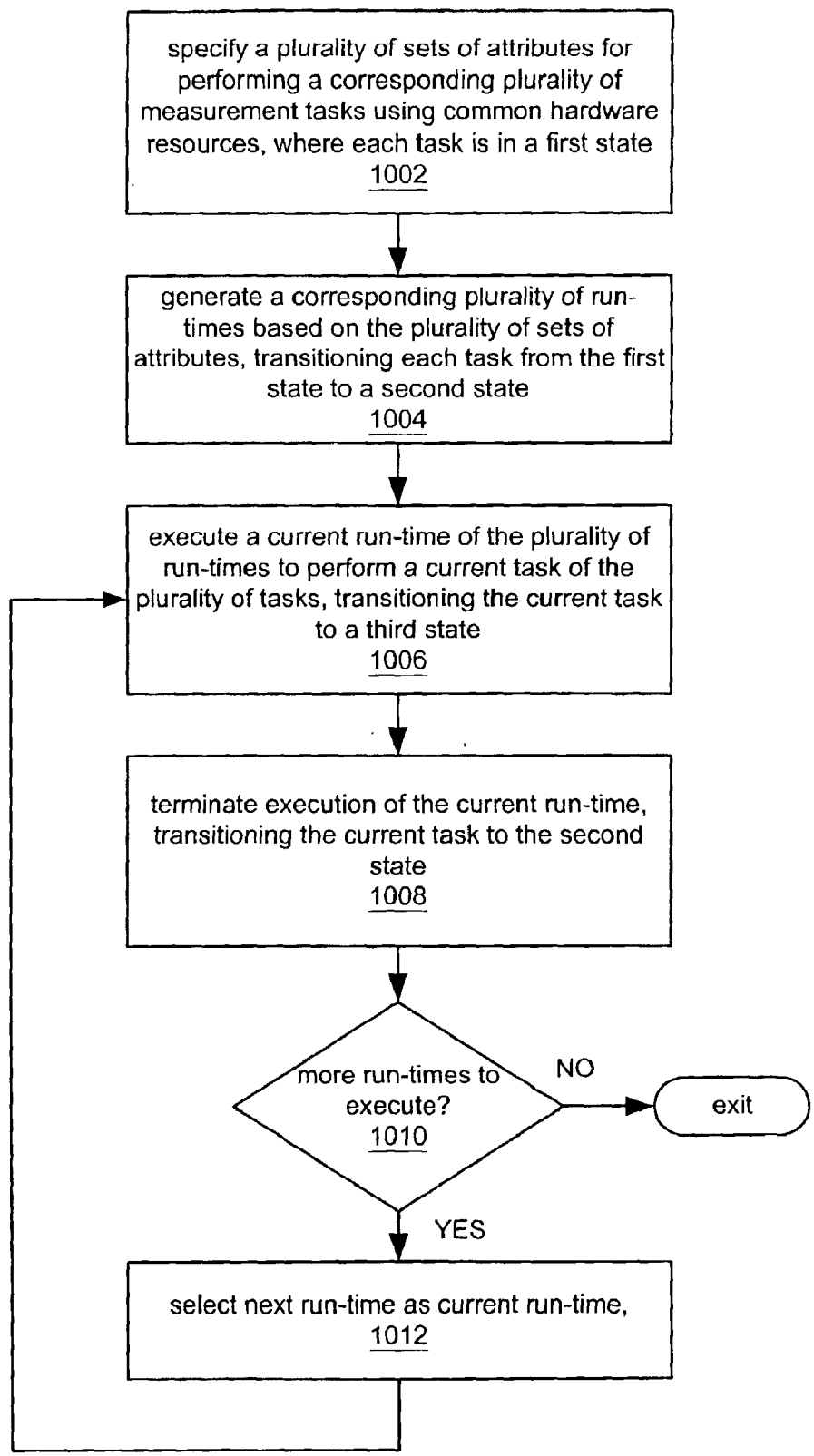
FIG. 10 flowcharts one embodiment of a method for using a task state model to perform a plurality of measurement tasks.

FIG. 10—Using the Task State Model to Perform Multiple Measurement Tasks

One of the benefits of the task-based state model described herein is that applications which use the task-based state model may be higher performing than applications which use the state models of the prior art. A primary unique characteristic of the task-based state model is that the state model is not coupled to the state of the resources (e.g., devices). Instead, the state model is associated with a task. This characteristic enables a customer to create multiple tasks, each with its own state, that all utilize the same resources.

Consider the following use case: a customer develops a manufacturing test application that sequentially and repeatedly executes multiple tests (tasks). Each test may utilize the same resources as other tests.

When using state models of the prior art, the customer would have to develop an application that, each time before a test is performed, explicitly configures the resources for that test. This explicit reconfiguration would occur for every test every time the test sequence is repeated.

In contrast, when using the task-based state model described herein, the customer may develop a higher performing application which first configures all of the tests, e.g., by specifying the customer-definable attributes for each test and then transitioning the task associated with each of the tests to the Verified state 504, then executing each test as desired, without having to repeat the verification process. Thus, a primary benefit of basing the state model on the measurement task instead of on the measurement resources is that multiple tasks may be specified which share use of one or more measurement resources. In other words, basing the state model (i.e., the states) on the status of the task may allow the portions of the task which are not specifically dependent on the status of the relevant hardware to be maintained separately from the hardware. Significant efficiencies may be achieved using this approach in that most of the work or expense involved in preparing the tasks for execution, i.e., the verification process, may be performed up front. Then, the multiple tasks may be performed sequentially, and optionally iteratively, without having to repeat the verification process for each task performance. FIG. 10 is a flowchart of one embodiment of a method for using a task state model to perform multiple measurement tasks, such as, for example, the multiple manufacturing tests mentioned above.

As FIG. 10 shows, in 1002, a plurality of sets of attributes may be specified for performing a corresponding plurality of measurement tasks, using one or more common measurement resources. Each of the plurality of measurement tasks may be in a first task state, e.g., in the Unverified state 502. In one embodiment, each of the sets of attributes may comprise a measurement task specification for the corresponding measurement task, as described above. In the manufacturing example from above, each measurement task may correspond to a respective manufacturing test.

Then, in 1004, a corresponding plurality of run-times may be generated based on the plurality of sets of attributes, thereby transitioning each of the measurement tasks from the first state (e.g., Unverified 502) to a second state, for example, to the Verified state 504. As mentioned above, each run-time may include a collection of measurement primitives, initialized with primitive settings derived from the attributes, and operable to manage corresponding measurement resources. Thus, in one embodiment, transitioning the measurement tasks from the Unverified state 502 to the Verified state 504 may include compiling the attributes to primitive settings, and initializing the corresponding measurement primitives with the primitive settings to produce the respective run-times for each measurement task, e.g., for each test in the manufacturing example above. In other words, the primitive settings for each measurement task may be deployed into a run-time for each task. It should be noted that at this stage, all of the specified measurement tasks have been prepared without regard to the status of installed hardware of the measurement system. Thus, at this point, before any test has been performed, the application has already created a task and corresponding run-time for each test. Each run-time contains the primitive settings specific to that test. The process of compiling the customer-definable attributes to primitive settings and deploying these primitive settings may be the most expensive operation from a performance perspective. With the task-based state model, these most expensive operations are performed only once; that is, when the manufacturing test system is initialized.

In 1006, a first, or current, run-time of the plurality of run-times may be executed to perform a corresponding current measurement task of the plurality of measurement tasks, thereby transitioning the current task from the second state (e.g., the Verified state 504) to a third state, e.g., the Running state 510. As described above, in one embodiment, transitioning from the Verified state 504 to the Running state 510 may include a number of intermediate task state transitions. For example, the task may first be transitioned from the Verified state 504 to the Reserved state 506, thereby acquiring the one or more measurement resources needed to perform the current measurement task. Then, the task may be transitioned from the Reserved state 506 to the Committed state 508, thereby configuring the one or more measurement resources with the corresponding one or more primitive settings. It is noted that the operation of performing each task is typically a very efficient operation. As the task associated with each test is transitioned to the Committed state 508, each measurement primitive may program its associated measurement resource with the specified primitive settings for that test. The measurement primitive preferably only programs those aspects of its associated resource that need to be changed for that test. After being configured the one or more resources may be operable to perform the current measurement task. Finally, the task may be transitioned from the Committed state 508 to the Running state 510, thereby executing the run-time to perform the measurement task using the one or more (common) measurement resources.

In 1008, execution of the current run-time may be terminated, for example, by user invocation of a Stop method, or by execution of a Stop node, thereby transitioning the current task to the second state, e.g., the Verified state 504. Note that this transition may include implicit transitions through one or more intervening task states, as described above.

Then, as FIG. 10 shows, in 1010, a determination may be made as to whether there are additional run-times to execute. If there are no more run-times to execute, then the method may terminate, as shown. If, on the other hand, there more run-times to execute, then as indicated in 1012, a next run-time may be selected as the new current run-time, and the method may return to step 1006, described above, where the new current run-time may be executed to perform another respective measurement task, thereby transitioning that task to the third state (the Running state 510). The method may then proceed with step 1008 as described above, iteratively executing and terminating execution of each run-time, thereby performing each of the plurality of measurement tasks in succession, where each task used the common one or more measurement resources to perform the desired measurement functions of that task.

It is noted that the approach described above may be used to iteratively perform a single task repeatedly, to iteratively cycle through a multitude of tasks, as described above, and/or to perform any combination of prepared measurement tasks, as desired. Therefore, while a measurement task state model may manage hardware measurement resources that perform the specific measurement operations, it also contains and manages state information unrelated to the hardware measurement resources. Unlike prior art measurement state models, the measurement task state model is a software construct independent of the hardware measurement resources, and so, may simultaneously facilitate or manage multiple measurement tasks which utilize common measurement hardware resources, each of which may be in any one of a variety of task states. Thus, the separation of hardware-specific aspects of the measurement process from the task-specific aspects via use of a task-based state model may substantially improve efficiencies and flexibility of the measurement system.

Figure 11A:
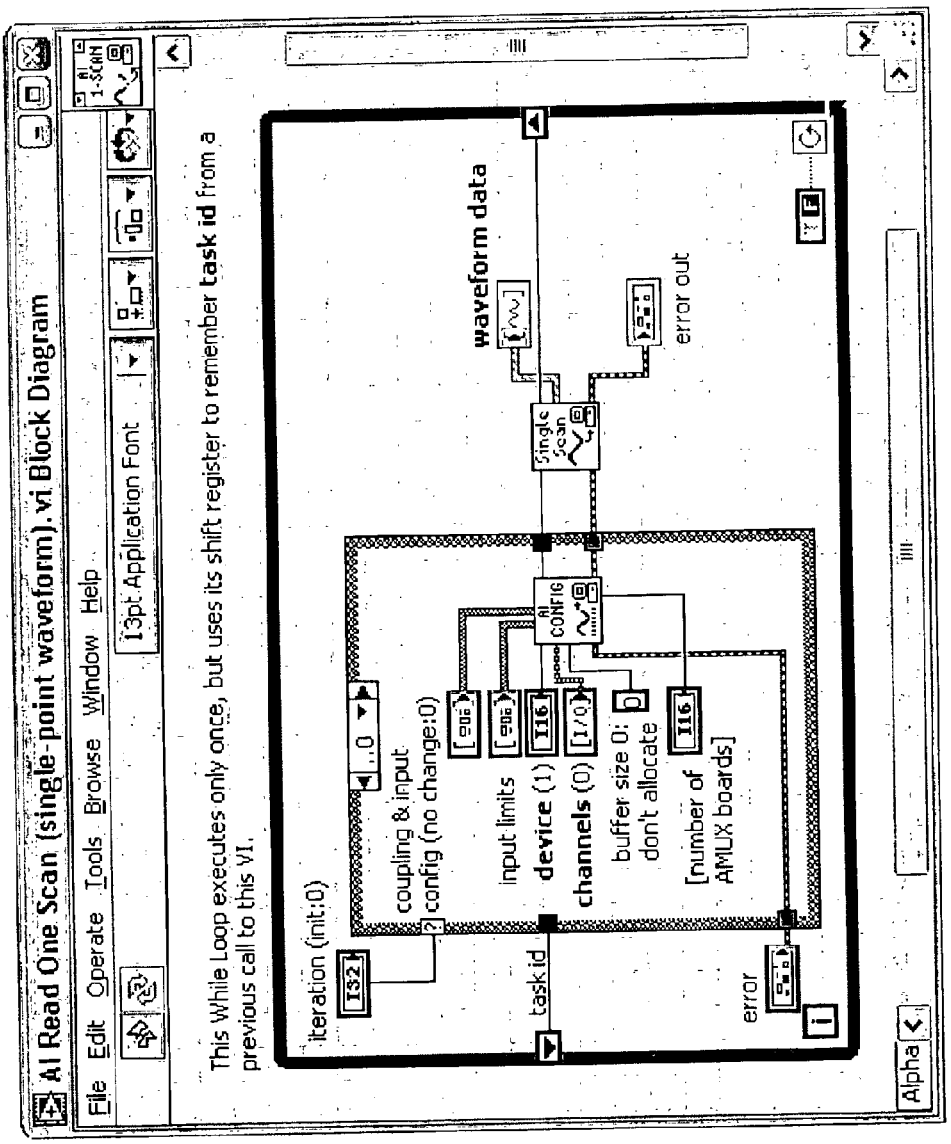
FIG. 11A is a block diagram of a graphical program which utilizes a state model to perform a measurement task, according to the prior art.
Figure 11B:
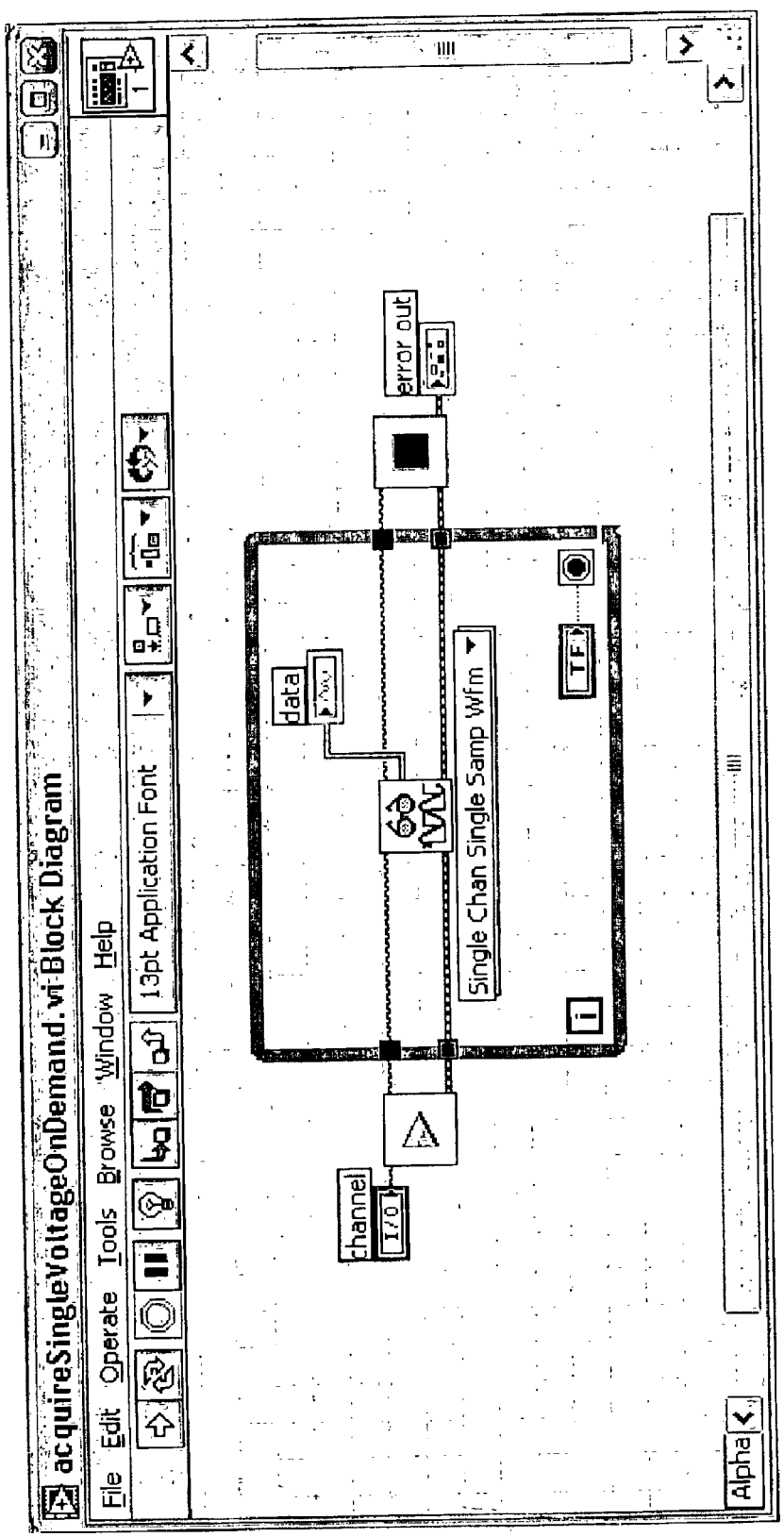
FIG. 11B is a block diagram of a graphical program which utilizes a state model to perform a measurement task, according to one embodiment.

FIGS. 11A and 11B—Example Application and Benefits of the Task-Based State Model As mentioned above, in prior art measurement systems, resources may be reserved, programmed, and unreserved continuously due to the fact that current state information of the system is unavailable to system processes and components. For example, in an experiment involving one prior art measurement system, an AI (Analog Input) Read One Scan task involved ten kernel transitions; calculating, verifying, and programming a scan list, timing, triggering, and dithering; calculating and verifying input limits multiple times; and checking accessories multiple times, for each read.

FIG. 11A illustrates one embodiment of a graphical program or VI which implements the AI Read One Scan task, where a single measurement from a single channel is repeatedly acquired, according to the prior art. The timing is based on invoking the "Single Scan" VI as opposed to a hardware clock. Since there is not a state model that is fundamental to the architecture, the author of this VI cannot optimize the performance of this VI by explicitly invoking state transitions. Instead, in this example, the author adds additional complexity to the diagram through shift registers and a case structure to ensure that the "AI Config" VI is only invoked the first time. Thus, the absence of a task-based state model may substantially decrease the usability and flexibility of the measurement system, and may increase the complexity of a given application.

In contrast, in one embodiment of the present invention, a state model of the system may be defined and enforced, substantially eliminating unnecessary state transitions, and enabling customers to more finely control state transitions. For example, in one experiment, a single read task, e.g., an Acquire Single Voltage On Demand task, performed by one embodiment of the invention involved one kernel transition per read, and executed approximately twenty times faster than the prior art measurement system mentioned above.

FIG. 11B illustrates one embodiment of a graphical program, i.e., a VI, which implements the Acquire Single Voltage on Demand task, where a single measurement from a single channel is repeatedly acquired, and where the graphical program uses the task-based state model described herein. In this example, the timing for the task is based on invoking a "DAQmx Read (Single Chan Single Samp Wfm)" VI as opposed to a hardware clock. Since the state model is a fundamental aspect of the architecture and since this state model is partially exposed to users, the author of this VI can explicitly invoke "start" and "stop" state transitions by invoking the "DAQmx Start" and "DAQmx Stop" VIs, respectively, e.g., by executing the Start and Stop graphical program nodes. These explicit state transitions may enable the author of this VI to optimize the performance of this VI for his particular application. As described in detail above, the explicit state transitions initiated by the Start and Stop methods/nodes may include various implicit state transitions as well.

Benefits of Implicit State Transitions

As described above, the use of a task-based state model which allows explicit state transitions to be invoked by the user may provide a great deal of control over the measurement process, such as by an advanced user. However, another benefit of the task-based state model may be improved usability for the less-advanced user. In general, a potential downside to using a state model is that by giving the advanced user access to all state transitions with which he or she can develop higher performance applications, the less-advanced user may also be required to understand and properly utilize all of these state transitions, which may decrease the usability of the system. Some prior art systems have attempted to strike a balance between these two seemingly contradicting requirements, and as a result, have not provided the advanced user with access to all state transitions, while at the same time have decreased usability of the system for the less-advanced customer.

The task-based state model doesn't attempt to balance these two requirements; instead, it fulfills both requirements through the support of implicit state transitions. Implicit state transitions enable the less-advanced user to ignore those state transition in which he is not interested. From the user's perspective, the system behaves as if the ignored states do not exist.

In one embodiment, in order to preserve the usability of the system, it may be necessary that the implicit state transitions apply to both forward (e.g., Unverified->Verified->Reserved->Committed->Running) and backward state transitions (e.g., Running->Committed->Reserved->Verified->Unverified) in order to meet the expectations of the less-advanced user. That is, the system may implicitly transition through the required intermediate states to return the task to the last state to which the user explicitly transitioned. For example, if the system implicitly transitions from the "Verified" state to the "Running" state when the user explicitly invoked the "start" state transition and then, when the user explicitly invoked the "stop" state transition, the system only transitioned back to the "Committed" state, the user may be confused since he did not expect the task to still be committed and reserved since he didn't explicitly commit and reserve the task. Instead, the user may expect that the task would be in the "Verified" state. The implicit state transitions in the backward direction to meet the user's expectations. Further examples of the benefits of implicit state transitions are presented below.

In one example of the use of implicit state transitions, a user may configure a task and then immediately read samples. When the user explicitly invokes the read operation, the task may implicitly transition through the "Verified", "Reserved", and "Committed" states to the "Running" state. The task may then invoke the read operation and wait for it to complete. When the read operation completes, the task may implicitly transition back through the "Committed" and "Reserved" states back to the "Verified" state. In this example the user didn't explicitly invoke any state transitions, and so they were able to completely ignore the state model.

In another example of the use of implicit state transitions, a user may configure a task, invoke the "start" state transition, and then read samples. When the user explicitly invokes the "start" state transition, the task may implicitly transition through the "Verified", "Reserved", and "Committed" states to the "Running" state. When the user explicitly invokes the read operation, the task doesn't make any implicit state transitions since the task is already in the "Running" state. When the user explicitly invokes the "stop" state transition, the task may implicitly transition back through the "Committed" and "Reserved" states back to the "Verified" state.

In yet another example the use of implicit state transitions, a user may configure a task, invoke the "commit" state transition, and then repeatedly invoke the "start" and "stop" state transitions. When the user explicitly invokes the "commit" state transition, the task may implicitly transition through the "Verified" and "Reserved" states to the "Committed" state. When the user explicitly invokes the "start" state transition, the task may transition to the "Running" state. When the user invokes the "stop" state transition, the task only transitions back to the "Committed" state. At this point, the user can again explicitly invoke the "start" state transition. When the user finally explicitly invokes the "uncommit" state transition, the task may implicitly transition back through the "Reserved" state to the "Verified" state.

Thus, various embodiments of the systems and methods disclosed herein may use a task-based state model in a measurement system to more efficiently and flexibly perform measurement tasks. Additionally, the measurement system may utilize implicit state transitions in a state model to increase the usability of the measurement system in performing measurement tasks.

Glossary of Terms actuator—device used to convert from one phenomenon to another. Typically, the user will need to use an actuator to convert the phenomenon generated by a device to a more useful phenomenon.

application program—a software program which is executable to perform one or more functions, e.g., a software program that is executable to perform one or more specified measurement tasks.

channel—hardware and software resources used to make a measurement or a generation. Hardware resources of a channel include I/O connector resources and internal resources such as filters, ADC, counters, and the like. Software resources of a channel include scaling, analysis, transfer, and the like. Experts may choose the optimal attribute settings for a channel based on the task specification.

compile—the act of the measurements expert system solving a problem, effectively transforming a measurement task specification into a complete run-time specification. The term "compile" also refers to converting a software program from source code into executable object code.

generation—production of a phenomenon, or a process which produces a phenomenon.

measurement—the retrieval of one or more characteristics of a phenomenon in order to produce a useful sample of information. For example, measurements may be performed by instruments or other types of devices which acquire real world data. Measurements may be performed for the purposes of simulation, hardware in the loop testing, validation, test, instrumentation, and manufacturing assembly, among other purposes.

measurement device—a hardware or virtual device which is operable to perform a measurement on a phenomenon, a generation of a phenomenon, or a connection. Example measurement devices include any of the devices shown in FIGS. 1A and 1B.

measurement expert system—a software program which may compile a measurement task specification into a run-time specification by selecting and invoking one or more experts.

measurement task—a group of measurements, generations, and connections that share timing, synchronization, and control.

measurement task configuration tool—a software program which may be used to configure measurement tasks; this may be a general purpose development tool or a specific tool; a type of a measurement task specifier, below.

measurement task specification—a set of attributes that define a measurement task. These attributes may be attributes of the phenomena, measurements, generations, or timing that comprise a measurement and automation application. A collection of one or more related attributes. Conceptually, the contents of a task specification represent one task which a user would like to perform atomically. The measurements expert system uses measurements experts to compile a task specification into a populated run-time specification.

measurement task specifier—a program which accepts user input and may be used to produce a measurement task specification for a given measurement task; similar to a task configuration tool, below. An example measurement task specifier is a measurement task configuration tool which may be invoked from a graphical or text-based development environment. Other examples of a measurement task specifier include a measurement task wizard, and a measurement task API. Specific examples of a measurement task specifier include LabVIEW, LabWindows/CVI, DiaDem, DasyLab, Visual Basic, Visual C++, Delphi, Mathwork's Simulink, Agilent Vee, SoftWire, and other similar programming development environments.

measurements expert—a type of expert designed to operate under arbitration of the Measurements Experts Library. The goal of a measurements expert is to compile a portion of a measurement task specification into a populated run-time specification.

phenomenon—a detectable signal. Users make measurements on phenomena, or generate them. Sensors and actuators convert from one phenomenon to another.

primitive—a single, cohesive object implementing a particular aspect of a measurement system. Primitive supervisors broker primitives. A run-time is composed of an aggregation of primitives.

primitive setting—a collection of properties associated with a particular primitive. Primitive settings are configured by measurements experts, and interpreted by primitive supervisors.

primitive supervisor—invoked by run-time builders, primitive supervisors interpret a specific primitive setting, using the contained properties to reserve an associated primitive.

resource—a single, reservable element of the total means available for performing measurements in a measurement system. Examples of resources include a hardware counter, a RTSI line, or a fixed amount of CPU cycles.

run-time—a collection or sequence of primitives in a specific environment implementing a measurement system. Run-times are built by run-time builders, and may be executed to perform a specific measurement task or operation. The term "run-time" may also refer to other forms of a software program that implement a measurement system.

run-time builder—a software program which may analyze a run-time specification, reserve one or more primitives according to the run-time specification, and configure one or more primitives according to the run-time specification. Interprets a particular run-time specification and builds a run-time. Primitive brokering is delegated to primitive supervisors. The term "run-time builder" may also refer to a software program which may analyze a run-time specification and configure other types of software entities, such as by configuring other types of software program(s) or data structures according to the run-time specification.

run-time specification—a set of parameters specifying hardware or software primitive configurations required for a specified measurement task. A collection of primitive settings populated by measurements experts. Run-time specifications are interpreted by run-time supervisors. The term "run-time specification" may also include a data structure or other representation of information that specifies a measurement task.

sensor—device used to convert from one phenomenon type to another. Typically, the user will need to use a sensor to convert the phenomenon to a type the device can sample. Example sensors include thermocouples, pressure transducers, cameras, etc.

virtual measurement device—a device which is implemented as a software program, or at least a portion of which is implemented as a software program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A measurement system, comprising:
    a computer system, comprising:
        a processor; and
        a memory medium coupled to the processor, wherein the memory medium stores:
            program instructions executable to perform a measurement task; and
            a task state model, wherein the task state model comprises a plurality of task states, wherein each of the task states corresponds to a status of the measurement task; and
    one or more measurement resources coupled to the computer system, wherein the program instructions are executable to perform the measurement task using the one or more measurement resources;
    wherein the program instructions are executable to perform the measurement task, wherein the program instructions are executable to perform transitions among said plurality of task states in performing the measurement task;
    wherein the measurement task is in a first task state of the plurality of task states;
    wherein a first portion of the program instructions is executable to perform a first operation that necessitates a transition from the first task state to a second task state of the plurality of task states;
    wherein the program instructions are further executable to:
        determine one or more task state transitions for transitioning the measurement task from the first task state to the second task state; and
        perform the one or more task state transitions to transition the measurement task from the first task state through one or more intermediate task states of the plurality of task states to the second task state prior to execution of the first portion of the program instructions.

2. The system of claim 1, wherein the program instructions are further executable to:
    perform a second operation that necessitates a transition from the second task state to a first intermediate task state of the one or more intermediate task states;
    determine a first one or more task state transitions for transitioning the measurement task from the second task state to the first intermediate task state;
    perform the first one or more task state transitions to transition the measurement task from the second task state through zero or more of the intermediate task states to the first intermediate task state; and
    determine a second one or more task state transitions for transitioning the measurement task from the first intermediate task state to the first task state;
    perform the second one or more task state transitions to transition the measurement task from the first intermediate task state through zero or more others of the intermediate task states to the first task state.

3. The system of claim 1, wherein the computer system further comprises:
    an input device, wherein the input device is operable to receive user input specifying one or more attributes for performing the measurement task;
    wherein the program instructions are further executable to:
        transition the measurement task from an Unverified state to a Verified state, thereby compiling the one or more attributes to one or more primitive settings, and deploying the one or more primitive settings into a run-time for the measurement task;
        transition the measurement task from the Verified state to a Reserved state, thereby acquiring one or more measurement resources to perform the measurement task;
        transition the measurement task from the Reserved state to a Committed state, thereby configuring the one or more measurement resources with the one or more primitive settings, wherein after said configuring, the one or more measurement resources are operable to perform the measurement task; and
        transition the measurement task from the Committed state to a Running state, thereby executing the run-time to perform the measurement task using the one or more measurement resources.

4. The system of claim 3, wherein the program instructions are further executable to:
    invoke termination of the measurement task;
    transition the measurement task from the Running state to the Committed state, thereby terminating operation of the one or more measurement resources;
    transition the measurement task from the Committed state to the Reserved state, thereby un-configuring the one or more measurement resources;

transition the measurement task from the Reserved state to the Verified state, thereby releasing the one or more measurement resources;

wherein the input device is further operable to receive user input modifying one or more of the one or more attributes, thereby transitioning the measurement task from the Verified state to the Unverified state.

5. The system of claim 1, wherein the plurality of task states comprises a sequence of task states, wherein the program instructions are further executable to:

transition the measurement task from a current task state of the sequence of task states to a non-contiguous target task state of the sequence of task states;

wherein, in said transitioning the measurement task from a current task state of the sequence of task states to a non-contiguous target task state, the program instructions are executable to programmatically transition the measurement task from the current task state through one or more intermediate task states of the sequence of task states to the non-contiguous target task state;

wherein, in programmatically transitioning the measurement task, the program instructions are executable to transition the measurement task without user programming or user input.

6. The system of claim 1, wherein the computer system further comprises:

an input device, wherein the input device is operable to receive user input specifying one or more attributes for performing a first measurement task, wherein the first measurement task is in a first task state;

wherein the program instructions are further executable to:

compile the first one or more attributes into first one or more primitive settings;

deploy the first one or more primitive settings into a first run-time, thereby transitioning the first measurement task to a second task state;

wherein the input device is further operable to receive user input specifying a second one or more attributes for performing a second measurement task, wherein after said specifying the second one or more attributes, the second measurement task is in the first task state;

wherein the program instructions are further executable to:

compile the second one or more attributes into second one or more primitive settings;

deploy the second one or more primitive settings into a second run-time, thereby transitioning the second measurement task to the second task state;

execute the first run-time to perform the first measurement task using one or more common hardware resources, thereby transitioning the first measurement task to a third task state;

terminate execution of the first run-time, thereby transitioning the first measurement task to the second task state;

execute the second run-time to perform the second measurement task using the one or more common hardware resources, thereby transitioning the second measurement task to the third task state; and terminate execution of the second run-time, thereby transitioning the second measurement task to the second task state.

7. The system of claim 6, wherein the program instructions are further executable to iteratively execute the first run-time, terminate execution of the first run-time, execute the second run-time, and terminate execution of the second run-time, one or more times.

8. The system of claim 6, wherein the first task state indicates that customer-definable attributes have not been compiled and deployed;

wherein the second task state indicates that the customer-definable attributes have been compiled to primitive settings, and that the primitive settings have been received by corresponding primitive supervisors; and wherein the third task state indicates that the one or more common hardware resources have been reserved and configured by the primitive supervisors and are performing a corresponding measurement task.

9. The system of claim 1, wherein the computer system further comprises:

an input device, wherein the input device is operable to receive user input specifying a plurality of sets of attributes for performing a corresponding plurality of measurement tasks;

wherein each of the plurality of measurement tasks is in a first task state;

wherein the program instructions are further executable to:

generate a corresponding plurality of run-times based on the plurality of sets of attributes, thereby transitioning each of the plurality of measurement tasks to a second task state;

execute a first run-time of the plurality of run-times to perform a first measurement task of the plurality of measurement tasks using one or more common hardware resources, thereby transitioning the first measurement task to a third task state;

terminate execution of the first run-time, thereby transitioning the first measurement task to the second task state; and iteratively perform said executing and said terminating using others of the plurality of run-times to perform one or more respective other measurement tasks of the plurality of measurement tasks using the one or more common hardware resources.

10. The system of claim 1, wherein each of the plurality of task states comprises:

one or more task sub-states, wherein each task sub-state comprises one or more state parameter values;

wherein said transitions among said plurality of task states comprise transitions among the one or more task sub-states of the plurality of task states.

11. The system of claim 1, wherein the program instructions are further executable to reconfigure the measurement task, wherein, in reconfiguring the measurement task, the program instructions are executable to perform transitions among task sub-states of a task state.

12. The system of claim 1, wherein each of the plurality of task states comprises one or more tuples of state values, each tuple comprising:

an attribute state, indicating a status for attributes in a measurement task specification, wherein the measurement task specification specifies the measurement task;

a primitive settings state, indicating a status for parameter settings for measurement primitives, wherein the parameter settings implement the measurement task specification, and wherein the parameter settings are comprised in a run-time specification; and a run-time state, indicating a status for a run-time, wherein the run-time comprises a plurality of measurement primitives, and wherein each of the plurality of measurement primitives is operable to operate, communicate with, and/or control a measurement resource in the measurement system to perform the measurement task in accordance with the parameter settings.

13. The system of claim 12, wherein said attributes comprise customer-definable attributes.

14. The system of claim 12,
wherein said one or more measurement resources comprise hardware and/or software; and
wherein said plurality of measurement primitives comprise hardware primitives and/or software primitives.

15. The system of claim 1, wherein the measurement task comprises one or more of:
data acquisition; and
signal generation.

16. The system of claim 1, wherein said program instructions comprise one or more methods each executable to invoke at least one of said transitions among the plurality of task states to perform the measurement task.

17. The system of claim 16, wherein at least one of said methods is executable to invoke a plurality of implicit task state transitions.

18. The system of claim 1, wherein the computer system further comprises:
an input device, wherein the input device is operable to receive user input specifying one or more attributes for performing the measurement task;
wherein said program instructions are further executable to:
transition the measurement task from an Initial state to a Deployed state, thereby compiling the one or more attributes to one or more primitive settings, and deploying the one or more primitive settings into a run-time for the measurement task; and
transition the measurement task from the Deployed state to an Executing state, thereby acquiring one or more measurement resources to perform the measurement task, configuring the one or more measurement resources with the one or more primitive settings, wherein after said configuring, the one or more measurement resources are operable to perform the measurement task, and executing the run-time to perform the measurement task using the one or more measurement resources.

19. The system of claim 18, wherein the program instructions are further executable to:
invoke termination of the measurement task; and
transition the measurement task from the Executing state to the Deployed state, thereby terminating operation of the one or more measurement resources, un-configuring the one or more measurement resources, releasing the one or more measurement resources,
wherein the input device is further operable to receive user input modifying one or more of the one or more attributes, thereby transitioning the measurement task from the Deployed state to the Initial state.

20. The system of claim 18,
wherein said Initial, said Deployed, and said Executing states comprise a sequence of task states; and
wherein the program instructions are further executable to:
transition the measurement task from a current task state of the sequence of task states to a non-contiguous target task state of the sequence of task states;
wherein, in transitioning the measurement task from a current task state of the sequence of task states to a non-contiguous target task state, the program instructions are executable to programmatically transition the measurement task from the current task state through one or more intermediate task states of the sequence of task states to the non-contiguous target task state; and
wherein, in programmatically transitioning the measurement task, the program instructions are executable to transition the measurement task without user programming or user input.

21. A method for using a task state model to perform a measurement task, wherein the task state model comprises a plurality of task states, the method comprising:
receiving user input specifying the measurement task; and
transitioning the measurement task from a first state of the plurality of task states to a second state of the plurality of task states to perform the measurement task;
wherein the plurality of task states comprises one or more of the following state sequences:
Unverified, Verified, Reserved, Committed, Running;
Unverified, Verified, Deployed, Reserved, Committed, Running;
Unverified, Verified, Committed, Running;
Unverified, Verified, Reserved, Running; and
Unverified, Deployed, Running.

22. The method of claim 21, further comprising:
receiving user input specifying a modification to the measurement task;
modifying the measurement task in accordance with said user input specifying the modification to the measurement task, wherein said modifying comprises:
programmatically transitioning the measurement task from a first task sub-state of a current task state to a second task sub-state of the current task state.

23. The method of claim 22, wherein, prior to said programmatically transitioning the measurement task from a first state of the plurality of task states to a second state of the plurality of task states, the method further comprises:
programmatically transitioning the measurement task from the second task sub-state of the current task state through zero or more other task sub-states to the first task sub-state of the current task state.

24. The method of claim 22, wherein said receiving user input specifying a modification, and said modifying are performed after said programmatically transitioning the measurement task from a first state of the plurality of task states to a second state of the plurality of task states to perform the measurement task, the method further comprising:
programmatically transitioning the measurement task from the second task sub-state of the current task state through zero or more other task sub-states to the first task sub-state of the current task state; and
performing the measurement task in accordance with said modifying.

25. A method for using a state model to perform a measurement task,
wherein the state model comprises a sequence of three or more states; and
wherein the measurement task is in a first state of the sequence of three or more states;
the method comprising:
invoking a first operation that necessitates a transition from the first state to a second state of the sequence of states;

programmatically determining one or more state transitions for transitioning the measurement task from the first state in the sequence of three or more states to the second state in the sequence of three or more states;

programmatically transitioning the measurement task from the first state through one or more intermediate states of the sequence of three or more states to the second state; and wherein said programmatically transitioning the measurement task comprises transitioning the measurement task without user programming or user input.

26. The method of claim 25, further comprising:

invoking a second operation that necessitates a transition from the second state to a first intermediate state of the one or more intermediate states;

programmatically determining a first one or more state transitions for transitioning the measurement task from the second state in the sequence of three or more states to the first intermediate state of the one or more intermediate states;

programmatically transitioning the measurement task from the second state through zero or more of the intermediate states to the first intermediate state after said determining the first one or more state transitions;

programmatically determining a second one or more state transitions for transitioning the measurement task from the first intermediate state of the one or more intermediate states to the first state in the sequence of three or more states;

programmatically transitioning the measurement task from the first intermediate state through zero or more others of the intermediate states to the first state after said determining the second one or more state transitions; and wherein said programmatically transitioning the measurement task comprises transitioning the measurement task without user programming or user input.

27. A method for using a task state model to perform a measurement task, the method comprising:

specifying one or more attributes for performing the measurement task;

transitioning the measurement task from an Unverified state to a Verified state, thereby compiling the one or more attributes to one or more primitive settings, and deploying the one or more primitive settings into a run-time for the measurement task;

transitioning the measurement task from the Verified state to a Reserved state, thereby acquiring one or more measurement resources to perform the measurement task;

transitioning the measurement task from the Reserved state to a Committed state, thereby configuring the one or more measurement resources with the one or more primitive settings, wherein after said configuring, the one or more measurement resources are operable to perform the measurement task; and transitioning the measurement task from the Committed state to a Running state, thereby executing the run-time to perform the measurement task using the one or more measurement resources.

28. The method of claim 27, further comprising:

invoking termination of the measurement task;

transitioning the measurement task from the Running state to the Committed state, thereby terminating operation of the one or more measurement resources;

transitioning the measurement task from the Committed state to the Reserved state, thereby un-configuring the one or more measurement resources;

transitioning the measurement task from the Reserved state to the Verified state, thereby releasing the one or more measurement resources; and receiving user input modifying one or more of the one or more attributes, thereby transitioning the measurement task from the Verified state to the Unverified state.

29. The method of claim 27, wherein said Unverified, said Verified, said Reserved, said Committed, and said Running states comprise a sequence of task states, the method further comprising:

transitioning the measurement task from a current state of the sequence of task states to a non-contiguous target state of the sequence of task states, wherein said transitioning from a current state of the sequence of task states to a non-contiguous target state comprises:
programmatically transitioning the measurement task from the current state through one or more intermediate states of the sequence of task states to the non-contiguous target state;

wherein said programmatically transitioning the measurement task comprises transitioning the measurement task without user programming or user input.

30. A method for using a task state model to perform a plurality of measurement tasks using one or more common hardware resources, the method comprising:

specifying a first one or more attributes for performing a first measurement task, wherein the first measurement task is in a first task state;

compiling the first one or more attributes into first one or more primitive settings;

deploying the first one or more primitive settings into a first run-time, thereby transitioning the first measurement task to a second task state;

specifying a second one or more attributes for performing a second measurement task, wherein after said specifying the second one or more attributes, the second measurement task is in the first task state;

compiling the second one or more attributes into second one or more primitive settings;

deploying the second one or more primitive settings into a second run-time, thereby transitioning the second measurement task to the second task state;

executing the first run-time to perform the first measurement task using the one or more common hardware resources, thereby transitioning the first measurement task to a third task state;

terminating execution of the first run-time, thereby transitioning the first measurement task to the second task state;

executing the second run-time to perform the second measurement task using the one or more common hardware resources, thereby transitioning the second measurement task to the third task state; and terminating execution of the second run-time, thereby transitioning the second measurement task to the second task state.

31. The method of claim 30, further comprising:

iteratively performing said executing the first run-time, said terminating execution of the first run-time, said executing the second run-time, and said terminating execution of the second run-time, one or more times.

32. The method of claim 30,
wherein the first task state indicates that customer-definable attributes have not been compiled and deployed;
wherein the second task state indicates that the customer-definable attributes have been compiled to primitive settings, and that the primitive settings have been received by corresponding primitive supervisors; and
wherein the third task state indicates that the one or more common hardware resources have been reserved and configured by the primitive supervisors and are performing a corresponding measurement task.

33. A method for using a task state model to perform measurement tasks using one or more common hardware resources, the method comprising:
specifying a plurality of sets of attributes for performing a corresponding plurality of measurement tasks, wherein each of the plurality of measurement tasks is in a first task state;
generating a corresponding plurality of run-times based on the plurality of sets of attributes, thereby transitioning each of the plurality of measurement tasks to a second task state;
executing a first run-time of the plurality of run-times to perform a first measurement task of the plurality of measurement tasks using the one or more common hardware resources, thereby transitioning the first measurement task to a third task state;
terminating execution of the first run-time, thereby transitioning the first measurement task to the second task state; and
iteratively performing said executing and said terminating using others of the plurality of run-times to perform one or more respective other measurement tasks of the plurality of measurement tasks using the one or more common hardware resources.

34. A system which uses a task state model to perform a measurement task, wherein the task state model comprises a plurality of task states, the system comprising:
means for specifying one or more attributes for performing the measurement task;
means for transitioning the measurement task from an Unverified state to a Verified state, thereby compiling the one or more attributes to one or more primitive settings, and deploying the one or more primitive settings into a run-time for the measurement task;
means for transitioning the measurement task from the Verified state to a Reserved state, thereby acquiring one or more measurement resources to perform the measurement task;
means for transitioning the measurement task from the Reserved state to a Committed state, thereby configuring the one or more measurement resources with the one or more primitive settings, wherein after said configuring, the one or more measurement resources are operable to perform the measurement task; and
means for transitioning the measurement task from the Committed state to a Running state, thereby executing the run-time to perform the measurement task using the one or more measurement resources.

35. A system which uses a task state model to perform a measurement task, wherein the task state model comprises a plurality of task states, the system comprising:
means for specifying a first one or more attributes for performing a first measurement task, wherein the first measurement task is in a first state;
means for compiling the first one or more attributes into first one or more primitive settings;
means for deploying the first one or more primitive settings into a first run-time, thereby transitioning the first measurement task to a second state;
means for specifying a second one or more attributes for performing a second measurement task, wherein after said specifying the second one or more attributes, the second measurement task is in the first state;
means for compiling the second one or more attributes into second one or more primitive settings;
means for deploying the second one or more primitive settings into a second run-time, thereby transitioning the second measurement task to the second state;
means for executing the first run-time to perform the first measurement task using one or more common hardware resources, thereby transitioning the first measurement task to a third state;
means for terminating execution of the first run-time, thereby transitioning the first measurement task to the second state;
means for executing the second run-time to perform the second measurement task using the one or more common hardware resources, thereby transitioning the second measurement task to the third state; and
means for terminating execution of the second run-time, thereby transitioning the second measurement task to the second state.

36. The system of claim 35, further comprising:
means for iteratively performing said executing the first run-time, said terminating execution of the first run-time, said executing the second run-time, and said terminating execution of the second run-time, one or more times.

37. A system which uses a task state model to perform a measurement task, wherein the task state model comprises a plurality of task states, the system comprising:
means for specifying a plurality of sets of attributes for performing a corresponding plurality of measurement tasks, wherein each of the plurality of measurement tasks is in a first state;
means for generating a corresponding plurality of run-tunes based on the plurality of sets of attributes, thereby transitioning each of the plurality of measurement tasks to a second state;
means for executing a first run-time of the plurality of run-times to perform a first measurement task of the plurality of measurement tasks using one or more common hardware resources, thereby transitioning the first measurement task to a third state;
means for terminating execution of the first run-time, thereby transitioning the first measurement task to the second state;
means for iteratively performing said executing and said terminating using others of the plurality of run-times to perform one or more respective other measurement tasks of the plurality of measurement tasks using the one or more common hardware resources.

38. A measurement system, comprising:
a computer system, comprising:
a processor; and
a memory medium coupled to the processor, wherein the memory medium stores:
program instructions executable to perform a measurement task; and a state model, wherein the state model comprises a plurality of states, wherein each of the states corresponds to a status of the measurement task; and one or more measurement resources coupled to the computer system, wherein the program instructions are executable to perform the measurement task using the one or more measurement resources;

wherein the program instructions are executable to perform the measurement task, wherein the program instructions are executable to use implicit transitions among said plurality of states in performing the measurement task; and wherein said implicit transitions comprise transitions which do not require user programming or user input;

wherein the measurement task is in a first state of the plurality of states;

wherein the program instructions are further executable to:
  invoke a first operation that necessitates a transition of the measurement task from the first state to a second state of the plurality of states;
  determine a first one or more state transitions for transitioning the measurement task from the first state in the plurality of states to the second state in the plurality of states; and
  implicitly transition the measurement task from the first state through one or more intermediate states of the plurality of states to the second state.

39. The system of claim 38, wherein the program instructions are further executable to perform:
  invoke a second operation that necessitates a transition of the measurement task from the second state to a first intermediate state of the one or more intermediate states;
  determine a second one or more state transitions for transitioning the measurement task from the second state in the plurality of states to the first intermediate state in the plurality of states;
  implicitly transition the measurement task from the second state through zero or more of the intermediate states to the first intermediate state;
  determine a third one or more state transitions for transitioning the measurement task from the first intermediate state in the plurality of states to the first state in the plurality of states; and
  implicitly transition the measurement task from the first intermediate state through zero or more others of the intermediate states to the first state.

40. The system of claim 38, wherein the computer system further comprises:
  an input device, wherein the input device is operable to receive user input specifying one or more attributes for performing the measurement task;
  wherein the program instructions are further executable to:
    transition the measurement task from an Unverified state to a Verified state, thereby compiling the one or more attributes to one or more primitive settings, and deploying the one or more primitive settings into a run-time for the measurement task;
    transition the measurement task from the Verified state to a Reserved state, thereby acquiring one or more measurement resources to perform the measurement task;
    transition the measurement task from the Reserved state to a Committed state, thereby configuring the one or more measurement resources with the one or more primitive settings, wherein after said configuring, the one or more measurement resources are operable to perform the measurement task; and
    transition the measurement task from the Committed state to a Running state, thereby executing the runtime to perform the measurement task using the one or more measurement resources.

41. The system of claim 40, wherein the program instructions are further executable to:
  invoke termination of the measurement task;
  transition the measurement task from the Running state to the Committed state, thereby terminating operation of the one or more measurement resources;
  transition the measurement task from the Committed state to the Reserved state, thereby un-configuring the one or more measurement resources;
  transition the measurement task from the Reserved state to the Verified state, thereby releasing the one or more measurement resources; and
  wherein the input device is further operable to receive user input modifying one or more of the one or more attributes, thereby transitioning the task from the Verified state to the Unverified state.

42. The system of claim 40, wherein said Unverified, said Verified, said Reserved, said Committed, and said Running states comprise a sequence of states, wherein the program instructions are further executable to:
  transition the measurement task from a current state of the sequence of states to a non-contiguous target state of the sequence of states;
  wherein, in said transitioning the measurement task from a current state of the sequence of states to a non-contiguous target state, the program instructions are executable to implicitly transition the measurement task from the current state through one or more intermediate states of the sequence of states to the non-contiguous target state; and
  wherein, in implicitly transitioning the measurement task, the program instructions are executable to transition the measurement task without user programming or user input.

43. The system of claim 38, wherein each of the plurality of states comprises:
  one or more sub-states, wherein each sub-state comprises one or mare state parameter values;
  wherein said implicit transitions among states comprise transitions among the one or more sub-states of the plurality of states.

44. The system of claim 38, wherein the program instructions are further executable to reconfigure the measurement task, wherein, in reconfiguring the measurement task, the program instructions are executable to perform transitions among sub-states of a state.

45. The system of claim 38,
  wherein said one or more measurement resources comprise hardware and/or software.

46. The system of claim 38, wherein the measurement task comprises one or more of:
  data acquisition; and
  signal generation.

47. The system of claim 38, wherein said program instructions comprise one or more methods each executable to invoke at least one of said implicit transitions among the plurality of states to perform the measurement task.

48. The system of claim 47, wherein at least one of said methods is executable to invoke a plurality of said implicit state transitions.

49. The system of claim 38, wherein said state model comprises a task state model.

50. A carrier medium which stores program instructions for performing a measurement task, wherein the program instructions implement a state model comprising a sequence of three or more states, wherein the program instructions are executable by a processor to perform:
  invoking a first operation that necessitates a transition from a first state in the sequence of three or more states to a second state of the sequence of three or more states;
  programmatically determining one or more state transitions for transitioning the measurement task from the first state in the sequence of three or more states to the second state in the sequence of three or more states; and
  programmatically transitioning the measurement task from the first state through one or more intermediate states of the sequence of three or more states to the second state;
  wherein said programmatically transitioning the measurement task comprises transitioning the measurement task without user programming or user input.

51. The carrier medium of claim 50, wherein the program instructions are further executable by the processor to perform:
  invoking a second operation that necessitates a transition from the second state to a first intermediate state of the one or more intermediate states;
  programmatically determining a first one or more state transitions for transitioning the measurement task from the second state in the sequence of three or more states to the first intermediate state of the one or more intermediate-states;
  programmatically transitioning the measurement task from the second state through zero or more of the intermediate states to the first intermediate state of the one or more intermediate-states after said determining the first one or more task state transitions;
  programmatically determining a second one or more task state transitions for transitioning the measurement task from the first intermediate state of the one or more intermediate states to the first state in the sequence of three or more states; and
  programmatically transitioning the measurement task from the first intermediate state of the one or more intermediate states through zero or more others of the one or more intermediate states to the first state after said determining the second one or more task state transitions.

52. A carrier medium which stores program instructions for performing a measurement task, wherein the program instructions implement a task state model comprising a sequence of three or more task states, wherein the program instructions are executable by a processor to perform:
  receiving input specifying one or more attributes for performing the measurement task;
  transitioning the measurement task from an Unverified state to a Verified state, thereby compiling the one or more attributes to one or more primitive settings, and deploying the one or more primitive settings into a run-time for the measurement task;
  transitioning the measurement task from the Verified state to a Reserved state, thereby acquiring one or more measurement resources to perform the measurement task;
  transitioning the measurement task from the Reserved state to a Committed state, thereby configuring the one or more measurement resources with the one or more primitive settings, wherein after said configuring, the one or more measurement resources are operable to perform the measurement task; and
  transitioning the measurement task from the Committed state to a Running state, thereby executing the run-time to perform the measurement task using the one or more measurement resources.

53. The carrier medium of claim 52, wherein the program instructions are further executable by the processor to perform:
  invoking termination of the measurement task;
  transitioning the measurement task from the Running state to the Committed state, thereby terminating operation of the one or more measurement resources;
  transitioning the measurement task from the Committed state to the Reserved state, thereby un-configuring the one or more measurement resources;
  transitioning the measurement task from the Reserved state to the Verified state, thereby releasing the one or more measurement resources; and
  receiving user input modifying one or more of the one or more attributes, thereby transitioning the measurement task from the Verified state to the Unverified state.

54. The carrier medium of claim 52, wherein said Unverified, said Verified, said Reserved, said Committed, and said Running states comprise a sequence of task states, wherein the program instructions are further executable by the processor to perform:
  transitioning the measurement task from a current state of the sequence of task states to a non-contiguous target state of the sequence of task states, wherein said transitioning from a current state of the sequence of task states to a non-contiguous target state comprises:
  programmatically transitioning the measurement task from the current state through one or more intermediate states of the sequence of task states to the non-contiguous target state;
  wherein said programmatically transitioning the measurement task comprises transitioning the measurement task without user programming or user input.

55. A carrier medium which stores program instructions for performing a plurality of measurement tasks using one or more common hardware resources, wherein the program instructions implement a task state model comprising a sequence of three or more task states, wherein the program instructions are executable by a processor to perform:
  receiving input specifying a first one or more attributes for performing a first measurement task, wherein the first measurement task in a first task state;
  compiling the first one or more attributes into first one or more primitive settings;
  deploying the first one or more primitive settings into a first run-time, thereby transitioning the first measurement task to a second task state;
  receiving input specifying a second one or more attributes for performing a second measurement task, wherein after said specifying the second one or more attributes, the second measurement task is in the first task state;

compiling the second one or more attributes into second one or more primitive settings;

deploying the second one or more primitive settings into a second run-time, thereby transitioning the second measurement task to the second task state;

executing the first run-time to perform the first measurement task using the one or more common hardware resources, thereby transitioning the first measurement task to a third task state;

terminating execution of the first run-time, thereby transitioning the first measurement task to the second task state;

executing the second run-time to perform the second measurement task using the one or more common hardware resources, thereby transitioning the second measurement task to the third task state; and terminating execution of the second run-time, thereby transitioning the second measurement task to the second task state.

56. The carrier medium of claim 55, wherein the program instructions are further executable by the processor to perform:

iteratively performing said executing the first run-time, said terminating execution of the first run-time, said executing the second run-time, and said terminating execution of the second run-time, one or more times.

57. The carrier medium of claim 55, wherein the first task state indicates that customer-definable attributes have not been compiled and deployed;

wherein the second task state indicates that the customer-definable attributes have been compiled to primitive settings, and that the primitive settings have been received by corresponding primitive supervisors; and wherein the third task state indicates that the one or more common hardware resources have been configured by the primitive supervisors and are performing the measurement task.

58. A carrier medium which stores program instructions for performing a plurality of measurement tasks using one or more common hardware resources, wherein the program instructions implement a task state model comprising a sequence of three or more task states, wherein the program instructions are executable by a processor to perform:

receiving input specifying a plurality of sets of attributes for performing a corresponding plurality of measurement tasks, wherein each of the plurality of measurement tasks is in a first task state;

generating a corresponding plurality of run-times based on the plurality of sets of attributes, thereby transitioning each of the plurality of measurement tasks to a second task state;

executing a first run-time of the plurality of run-times to perform a first measurement task of the plurality of measurement tasks using the one or more common hardware resources, thereby transitioning the first measurement task to a third task state;

terminating execution of the first run-time, thereby transitioning the first measurement task to the second task state;

iteratively performing said executing and said terminating using others of the plurality of run-times to perform one or more respective other measurement tasks of the plurality of measurement tasks using the one or more common hardware resources.

59. A measurement system, comprising:

a computer system, comprising:
  a processor; and
  a memory medium coupled to the processor, wherein the memory medium stores:
    program instructions executable to perform a measurement task; and
    a task state model, wherein the task state model comprises a plurality of task states, wherein each of the task states corresponds to a status of the measurement task; and one or more measurement resources coupled to the computer system, wherein the program instructions are executable to perform the measurement task using the one or more measurement resources;

wherein the program instructions are executable to perform the measurement task, wherein the program instructions are executable to perform transitions among said plurality of task states in performing the measurement task;

wherein the computer system farther comprises:
  an input device, wherein the input device is operable to receive user input specifying one or more attributes for performing the measurement task; and wherein the program instructions are further executable to:
  transition the measurement task from an Unverified state to a Verified state, thereby compiling the one or more attributes to one or more primitive settings, and deploying the one or more primitive settings into a run-time for the measurement task;
  transition the measurement task from the Verified state to a Reserved state, thereby acquiring one or more measurement resources to perform the measurement task;
  transition the measurement task from the Reserved state to a Committed state, thereby configuring the one or more measurement resources with the one or more primitive settings, wherein after said configuring, the one or more measurement resources are operable to perform the measurement task; and
  transition the measurement task from the Committed state to a Running state, thereby executing the run-time to perform the measurement task using the one or more measurement resources.

60. A measurement system, comprising:

a computer system, comprising:
  a processor; and
  a memory medium coupled to the processor, wherein the memory medium stores:
    program instructions executable to perform a measurement task; and
    a task state model, wherein the task state model comprises a plurality of task states, wherein each of the task states corresponds to a status of the measurement task; and one or more measurement resources coupled to the computer system, wherein the program instructions are executable to perform the measurement task using the one or more measurement resources;

wherein the program instructions are executable to perform the measurement task, wherein the program instructions are executable to perform transitions among said plurality of task states in performing the measurement task;

wherein the plurality of task states comprises a sequence of task states, wherein the program instructions are further executable to:

transition the measurement task from a current task state of the sequence of task states to a non-contiguous target task state of the sequence of task states;

wherein, in said transitioning the measurement task from a current task state of the sequence of task states to a non-contiguous target task state, the program instructions are executable to programmatically transition the measurement task from the current task state through one or more intermediate task states of the sequence of task states to the non-contiguous target task state; and wherein, in programmatically transitioning the measurement task, the program instructions are executable to transition the measurement task without user programming or user input.

61. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;
wherein the program instructions are executable to perform the measurement task, wherein the program instructions are executable to perform transitions among said plurality of task states in performing the measurement task;
wherein the computer system further comprises:
an input device, wherein the input device is operable to receive user input specifying one or more attributes for performing a first measurement task, wherein the first measurement task is in a first task state;
wherein the program instructions are further executable to:
compile the first one or more attributes into first one or more primitive settings;
deploy the first one or more primitive settings into a first run-time, thereby transitioning the first measurement task to a second task state;
wherein the input device is further operable to receive user input specifying a second one or more attributes for performing a second measurement task, wherein after said specifying the second one or more attributes, the second measurement task is in the first task state; and
wherein the program instructions are further executable to:
compile the second one or more attributes into second one or more primitive settings;
deploy the second one or more primitive settings into a second run-time, thereby transitioning the second measurement task to the second task state;
execute the first run-time to perform the first measurement task using one or more common hardware resources, thereby transitioning the first measurement task to a third task state;
terminate execution of the first run-time, thereby transitioning the first measurement task to the second task state;
execute the second run-time to perform the second measurement task using the one or more common hardware resources, thereby transitioning the second measurement task to the third task state; and
terminate execution of the second run-time, thereby transitioning the second measurement task to the second task state.

62. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;
wherein the program instructions are executable to perform the measurement task, wherein the program instructions are executable to perform transitions among said plurality of task states in performing the measurement task;
wherein the computer system further comprises:
an input device, wherein the input device is operable to receive user input specifying a plurality of sets of attributes for performing a corresponding plurality of measurement tasks; and
wherein each of the plurality of measurement tasks is in a first task state, wherein the program instructions are further executable to:
generate a corresponding plurality of run-times based on the plurality of sets of attributes, thereby transitioning each of the plurality of measurement tasks to a second task state;
execute a first run-time of the plurality of run-times to perform a first measurement task of the plurality of measurement tasks using one or more common hardware resources, thereby transitioning the first measurement task to a third task state;
terminate execution of the first run-time, thereby transitioning the first measurement task to the second task state; and
iteratively perform said executing and said terminating using others of the plurality of run-times to perform one or more respective other measurement tasks of the plurality of measurement tasks using the one or more common hardware resources.

63. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;

wherein the program instructions are executable to perform the measurement task, wherein the program instructions are executable to perform transitions among said plurality of task states in performing the measurement task;

wherein each of the plurality of task states comprises:
one or more task sub-states, wherein each task sub-state comprises one or more state parameter values; and wherein said transitions among said plurality of task states comprise transitions among the one or more task sub-states of the plurality of task states.

64. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;
wherein the program instructions are executable to perform the measurement task, wherein the program instructions are executable to perform transitions among said plurality of task states in performing the measurement task; and
wherein the program instructions are further executable to reconfigure the measurement task, wherein, in reconfiguring the measurement task, the program instructions are executable to perform transitions among task sub-states of a task state.

65. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;
wherein the program instructions are executable to perform the measurement task, wherein the program instructions are executable to perform transitions among said plurality of task states in performing the measurement task; and
wherein each of the plurality of task states comprises one or more tuples of state values, each tuple comprising:
an attribute state, indicating a status for attributes in a measurement task specification, wherein the measurement task specification specifies the measurement task;
a primitive settings state, indicating a status for parameter settings for measurement primitives, wherein the parameter settings implement the measurement task specification, and wherein the parameter settings are comprised in a run-time specification; and
a run-time state, indicating a status for a run-time, wherein the run-time comprises a plurality of measurement primitives, and wherein each of the plurality of measurement primitives is operable to operate, communicate with, and/or control a measurement resource in the measurement system to perform the measurement task in accordance with the parameter settings.

66. A measurement system, comprising:
a computer system, comprising:
a processor; and
a memory medium coupled to the processor, wherein the memory medium stores:
program instructions executable to perform a measurement task; and
a task state model, wherein the task state model comprises a plurality of task states, wherein each of the task states corresponds to a status of the measurement task; and
one or more measurement resources coupled to the computer system, wherein the program instructions are executable to perform the measurement task using the one or more measurement resources;
wherein the program instructions are executable to perform the measurement task, wherein the program instructions are executable to perform transitions among said plurality of task states in performing the measurement task;
wherein the computer system further comprises:
an input device, wherein the input device is operable to receive user input specifying one or more attributes for performing the measurement task; and
wherein said program instructions are further executable to:
transition the measurement task from an Initial state to a Deployed state, thereby compiling the one or more attributes to one or more primitive settings, and deploying the one or more primitive settings into a run-time for the measurement task; and
transition the measurement task from the Deployed state to an Executing state, thereby acquiring one or more measurement resources to perform the measurement task, configuring the one or more measurement resources with the one or more primitive settings, wherein after said configuring, the one or more measurement resources are operable to perform the measurement task, and executing the run-time to perform the measurement task using the one or more measurement resources.

67. A measurement system, comprising:
a computer system, comprising:
a processor; and
a memory medium coupled to the processor, wherein the memory medium stores:
program instructions executable to perform a measurement task; and
a state model, wherein the state model comprises a plurality of states, wherein each of the states corresponds to a status of the measurement task; and
one or more measurement resources coupled to the computer system, wherein the program instructions are executable to perform the measurement task using the one or more measurement resources;

wherein the program instructions are executable to perform the measurement task, wherein the program instructions are executable to use implicit transitions among said plurality of states in performing the measurement task;

wherein said implicit transitions comprise transitions which do not require user programming or user input;

wherein the computer system further comprises:
- an input device, wherein the input device is operable to receive user input specifying one or more attributes for performing the measurement task; and wherein the program instructions are further executable to:
- transition the measurement task from an Unverified state to a Verified state, thereby compiling the one or more attributes to one or more primitive settings, and deploying the one or more primitive settings into a run-time for the measurement task;
- transition the measurement task from the Verified state to a Reserved state, thereby acquiring one or more measurement resources to perform the measurement task;
- transition the measurement task from the Reserved state to a Committed state, thereby configuring the one or more measurement resources with the one or more primitive settings, wherein after said configuring, the one or more measurement resources are operable to perform the measurement task; and
- transition the measurement task from the Committed state to a Running state, thereby executing the run-time to perform the measurement task using the one or more measurement resources.

68. A measurement system, comprising:

a computer system, comprising:
- a processor; and
- a memory medium coupled to the processor, wherein the memory medium stores:
  - program instructions executable to perform a measurement task; and
  - a state model, wherein the state model comprises a plurality of states, wherein each of the states corresponds to a status of the measurement task; and one or more measurement resources coupled to the computer system, wherein the program instructions are executable to perform the measurement task using the one or more measurement resources;

wherein the program instructions are executable to perform the measurement task, wherein the program instructions are executable to use implicit transitions among said plurality of states in performing the measurement task;

wherein said implicit transitions comprise transitions which do not require user programming or user input;

wherein each of the plurality of states comprises:
- one or more sub-states, wherein each sub-state comprises one or more state parameter values; and wherein said implicit transitions among states comprise transitions among the one or more sub-states of the plurality of states.

69. A measurement system, comprising:

a computer system, comprising:
- a processor; and
- a memory medium coupled to the processor, wherein the memory medium stores:
  - program instructions executable to perform a measurement task; and
  - a state model, wherein the state model comprises a plurality of states, wherein each of the states corresponds to a status of the measurement task; and one or more measurement resources coupled to the computer system, wherein the program instructions are executable to perform the measurement task using the one or more measurement resources;

wherein the program instructions are executable to perform the measurement task, wherein the program instructions are executable to use implicit transitions among said plurality of states in performing the measurement task;

wherein said implicit transitions comprise transitions which do not require user programming or user input; and wherein the program instructions are further executable to reconfigure the measurement task, wherein, in reconfiguring the measurement task, the program instructions are executable to perform transitions among sub-states of a state.

* * * * *